United States Patent
Ueda et al.

(10) Patent No.: US 6,828,086 B2
(45) Date of Patent: Dec. 7, 2004

(54) WATER-BASED COATING COMPOSITION, INFRARED ABSORBING FILM, AND PHOTOTHERMOGRAPHIC MATERIAL BY USE THEREOF

(75) Inventors: Eiichi Ueda, Hino (JP); Chiaki Nagaike, Asaka (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/246,925

(22) Filed: Sep. 18, 2002

(65) Prior Publication Data

US 2003/0186180 A1 Oct. 2, 2003

(30) Foreign Application Priority Data

Sep. 27, 2001 (JP) ........................................ 2001-296650

(51) Int. Cl.$^7$ ......................... G03C 1/815; G03C 1/498
(52) U.S. Cl. ...................... 430/523; 430/514; 430/522; 430/523; 430/531; 430/584; 430/944
(58) Field of Search ................. 430/619, 514, 430/522, 523, 531, 584, 944

(56) References Cited

U.S. PATENT DOCUMENTS 6,391,535 B1 * 5/2002 Arimoto et al. ............ 430/619
6,444,415 B1 * 9/2002 Tanaka et al. ............. 430/517
6,475,697 B2 * 11/2002 Arimoto et al. ............ 430/263

* cited by examiner

*Primary Examiner*—Thorl Chea
(74) *Attorney, Agent, or Firm*—Squire, Sanders & Dempsey

(57) ABSTRACT

A water-based coating composition is disclosed, comprising a latex comprising a polymer impregnated with an infared absorbing compound and a water-soluble polyester or latex comprising polymer containing an active methylene group. An infrared absorbing film and a photothermographic material by use thereof are also disclosed.

6 Claims, No Drawings

WATER-BASED COATING COMPOSITION, INFRARED ABSORBING FILM, AND PHOTOTHERMOGRAPHIC MATERIAL BY USE THEREOF

FIELD OF THE INVENTION

The present invention relates to a water-based coating composition to form an infrared absorbing layer, an infrared absorbing film obtained by coating the composition on a substrate and drying it to form the infrared absorbing layer, and an imaging material or photothermographic material by the use thereof.

BACKGROUND OF THE INVENTION

In imaging materials forming images through light, there is known a fact that when exposed to light, incident light is reflected or refracted on the surface or interlayer surface of the imaging material, or on the phase separation interface within the imaging material, thereby forming a blurred image and leading to deteriorated sharpness. To prevent this, so-called anti-halation dyes (hereinafter, also denoted as AH dyes) and anti-irradiation dyes (hereinafter, also denoted as AI dyes) are broadly employed.

The recent digitalization trend results in image formation using laser light. For example, infrared lasers are used as a light source of a laser image for medical use or an image setter for use in graphic arts. As an imaging material used as an output of the foregoing are employed photothermographic materials, in which infrared absorbing compounds are used as an AH dye or AI dye.

Representative examples of the infrared absorbing compounds include organic dyes and it is well known that cyanine dyes, oxonol dyes, squalelium dyes, thiopyrylium-croconium dyes, pyryliumcroconium dyes and polymethine dyes are used in the photothermographic material. These infrared absorbing compounds include a lipophilic compound and a water-soluble compound. In the case of the lipophilic compound, a hydrophobic binder is used as a binder and in the case of the water-soluble compound is used a water-soluble binder or a latex of a hydrophilic binder dispersed in water. However, in the former case, organic solvents are used as a solvent, so that a large amount of industrial investments such as a solvent recovery equipment are needed in consideration of the environment. In the latter case, on the other hand, water-based coating and drying are feasible and advantageous in environmental concerns, however, the use of a water-soluble dye produces problems with respect to water resistance of the infrared absorbing dye. Examples of a means for enabling water-based coating and drying and for providing water resistance include a method in which an aqueous dispersion comprised of finely pulverized solid lipophilic dye particles dispersed in water is coated to form an infrared absorbing layer. However, the solid dye particle dispersion produces a broader absorption band, compared to being dissolved in an organic solvent, making it difficult to form an infrared absorbing layer having desired absorption wavelengths and the desired hardness. Therefore, there is desired a water-based coating composition which enables conducting water-based coating and drying and to form an infrared absorbing layer having desired absorption wavelengths and desired hardness, and an imaging material by the use thereof.

SUMMARY OF THE INVENTION

Accordingly, it is an object of the invention to provide an infrared absorbing film in which an infrared absorbing layer can be formed by water-based coating and the formed infrared absorbing layer has enhanced water resistance and hardness and exhibits absorption similar to that of the dye dissolved in a solvent, and an imaging material or photothermographic material by the use thereof.

The foregoing object of the invention can be accomplished by the following constitution:

1. A water-based coating composition comprising a latex impregnated with an infrared absorbing compound and a water-soluble polyester;
2. A water-based coating composition comprising a latex impregnated with an infrared absorbing compound and a latex comprised of an active methylene group-containing polymer;

DETAILED DESCRIPTION OF THE INVENTION

Infrared Absorbing Compound

The infrared absorbing compounds usable in the invention include any organic compound capable of absorbing infrared rays. Representative examples of the organic compound capable of absorbing infrared rays include infrared dyes, such as cyanine dyes, oxonol dyes, squalelium dyes, thiopyryliumcroconium dyes, pyryliumcroconium dyes and polymethine dyes.

Preferred infrared absorbing compounds used in the invention are those represented by the following formulas (1) through (4):

formula (1)

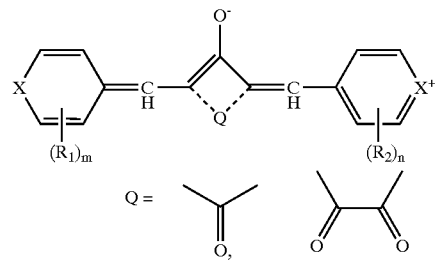

wherein X represents a sulfur atom or an oxygen atom; $R_1$ and $R_2$ each represent a univalent substituent group; m and n each represent 0, 1, 2, 3 or 4;

formula (2)

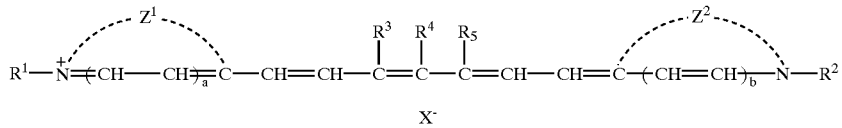

wherein $Z_1$ and $Z_2$ are each a non-metallic atom group necessary to form a 5- or 6-membered nitrogen-containing heterocyclic ring, which may be condensed with another ring; $R^1$ and $R^2$ are each an alkyl group, alkenyl group or aralkyl group; $R^3$ and $R^5$ are each a hydrogen atom or are non-metallic atom groups which may be the same or different and which are linked together with each other to form a 5- or 6-membered ring; $R^4$ is a hydrogen atom, alkyl group, halogen atom, aryl group, —N($R^6$)$R^7$, —$SR^8$ or —$OR^9$, in which $R^6$ is a hydrogen atom, alkyl group, or aryl group, $R^7$ represents an alkyl group, aryl group, sulfonyl group or acyl group, $R^8$ and $R^9$ are each an alkyl group or aryl group, provided that $R^6$ and $R^7$ may combine with each other to form a 5- or 6-membered ring; a and b each are 0 or 1; and $X^-$ is an anion;

formula (3)

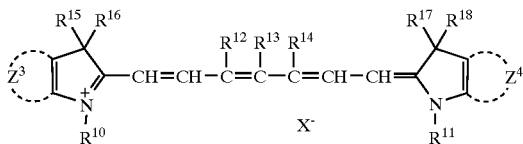

wherein $Z^3$ and $Z^4$ each represent a non-metallic atom group necessary to form a benzene or naphthalene ring (a condensed benzene or naphthalene ring, or a condensed benzo- or naphtho-ring); $R^{10}$ and $R^{11}$ each represent an alkyl group, aralkyl group or alkenyl group; $R^{12}$ and $R^{14}$ each represent a hydrogen atom or a non-metallic atom group necessary to form a 5- or 6-membered ring; $R^{13}$ represents a hydrogen atom, alkyl group, halogen atom, aryl group, —N($R^{19}$)$R^{20}$, —$SR^{21}$ or —$OR^{22}$, in which $R^{19}$, $R^{20}$, $R^{21}$ and $R^{22}$ each represent an alkyl group or aryl group, provided that $R^{19}$ and $R^{20}$ may combine with each other to form a ring; $R^{15}$, $R^{16}$, $R^{17}$ and $R^{18}$ are each an alkyl group, provided that $R^{15}$ and $R^{16}$, or $R^{17}$ and $R^{18}$ may combine with each other to form a ring; and $X^-$ represents an anion;

formula (4)

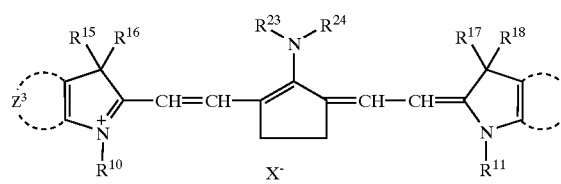

wherein $Z^3$ and $Z^4$ each represent a non-metallic atom group necessary to form a benzene or naphthalene ring (i.e., benzo- or naphtha-condensed ring); $R^{10}$ and $R^{11}$ each represent an alkyl group, aralkyl group or alkenyl group; $R^{23}$ and $R^{24}$ each represent an alkyl group, or aryl group; $R^{15}$, $R^{16}$, $R^{17}$ and $R^{18}$ each represent an alkyl group, provided that $R^{15}$ and $R^{16}$, or $R^{17}$ and $R^{18}$ may combine with each other to form a ring; and $X^-$ represents an anion.

The compound represented by the foregoing formula (1) will be further described. In the formula (1), $R_1$ and $R_2$ are each a univalent substituent group. The univalent substituent group is not specifically limited and preferred examples thereof include an alkyl group (e.g., methyl, ethyl, isopropyl, t-butyl, methoxymethyl, methoxyethyl, 2-ethylhexyl, 2-hexyldecyl, benzyl), and aryl group (e.g., phenyl, 4-chlorophenyl, 2,6-dimethylphenyl). Of these, an alkyl group is more preferred and t-butyl is still more preferred. $R_1$ and $R_2$ may combine with each other to form a ring; m and n are each an integer of 0 to 4 and preferably 0, 1 or 2.

Exemplary examples of the compound represented by formula (1) are shown below, but the invention is not limited to these.

1-1
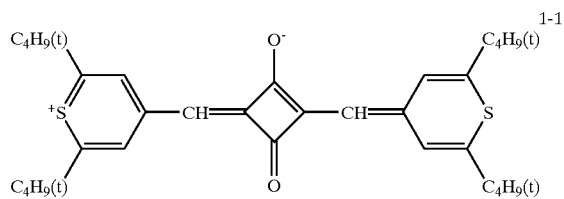

1-2
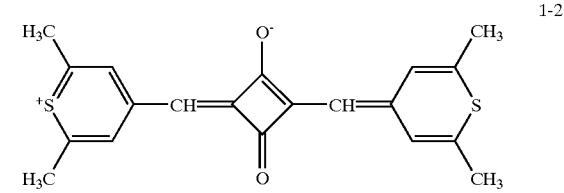

1-3
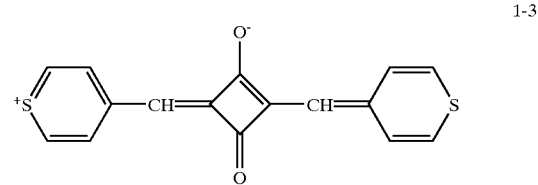

1-4
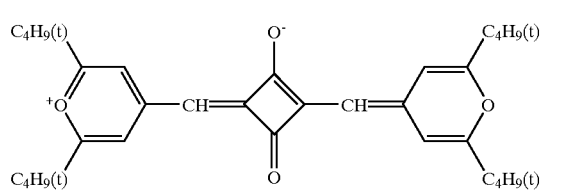

1-5
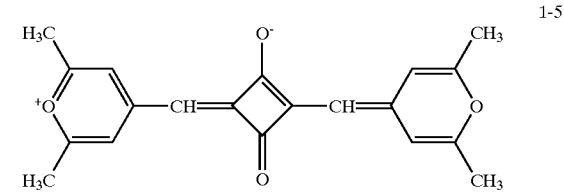

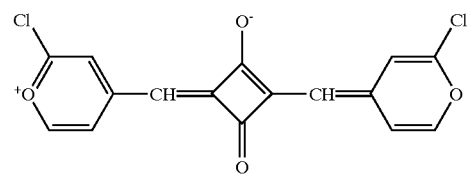

1-6

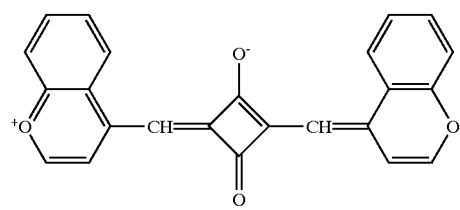

1-7

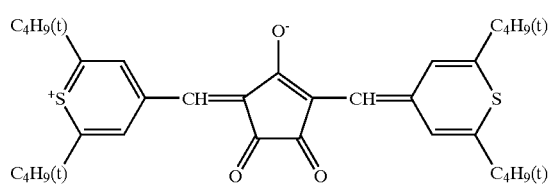

1-8

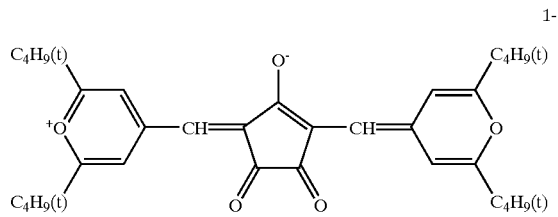

1-9

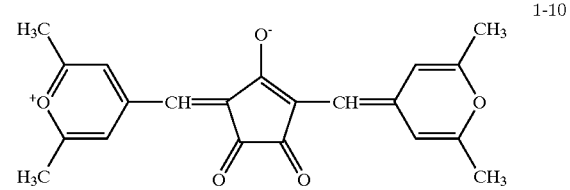

1-10

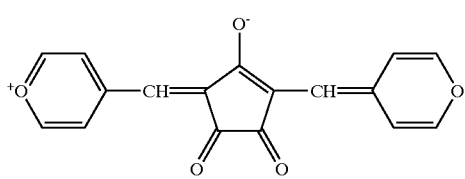

1-11

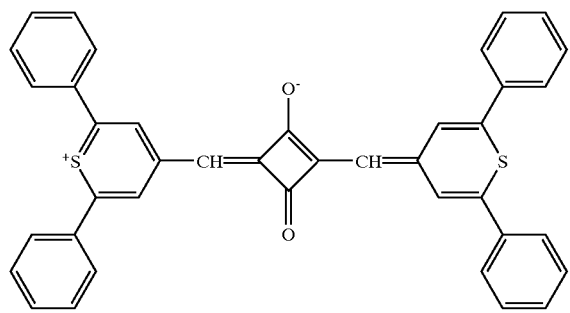

1-12

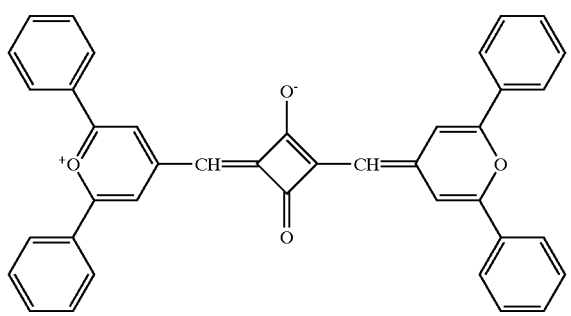

1-13

The compound represented by formula (2) will be described. In the foregoing formula (2), examples of a 5- or 6-membered nitrogen-containing heterocyclic ring, which may be condensed include an oxazole ring, isooxazole ring, benzoxazole ring, naphthoxazole ring, thiazole ring, benzothiazole ring, naphthothiazole ring, indolenine ring, benzoindolenine ring, imidazole ring, benzoimidazole ring, naphthoimidazole ring, quinoline ring, pyrimidine ring pyrrolopyridine ring, flopyrrole ring. Of these rings, a 5-membered nitrogen-containing heterocyclic ring which is condensed with a benzene or naphthalene ring is preferred, and an indolenine ring is more preferred. Substituent groups of the foregoing heterocyclic rings include a lower alkyl group (e.g., methyl, ethyl), alkoxy group (e.g., methoxy, ethoxy), phenoxy group (e.g., unsubstituted phenoxy, p-chlorophenoxy), carboxyl group, halogen atom (e.g., F, Cl, Br), alkoxycarbonyl group (e.g., ethoxycarbonyl), cyano group, nitro group, and hydroxy group.

The alkyl group represented by $R^1$, $R^2$, $R^4$, $R^8$ and $R^9$ is preferably an alkyl group having 1 to 6 carbon atoms (e.g., methyl, ethyl, propyl, butyl, isobutyl, pentyl, hexyl). The alkyl group may be substituted with hydroxy, carboxyl, or a halogen atom (e.g., Cl, Br). The alkyl group represented by $R^6$ and $R^7$ is an alkyl group represented by $R^1$, $R^2$, $R^4$, $R^8$ and $R^9$ or an alkoxycarbonylalkyl group (e.g., methoxycarbonylmethyl, ethoxycarbonylmethyl). Examples of a 5- or 6-membered ring formed by the combination of $R^3$ and $R^5$ include a cyclopentene ring and cyclohexene ring, which may be substituted by a substituent group (e.g., methyl, t-butyl, phenyl).

The halogen atom represented by $R^4$ includes, for example, an atom of Cl or Br. The aryl group represented by $R^4$, $R^6$, $R^8$ and $R^9$ are preferably an aryl group having 6 to 125 carbon atoms, such as phenyl, and naphthyl. This aryl group may be substituted by a substituent such as defined in $Z^1$. The alkyl group represented by $R^1$ and $R^2$ is preferably an aralkyl group having 7 to 12 carbon atoms (e.g., benzyl, phenylethyl), which may be substituted by a substituent (e.g., methyl, alkoxy, Cl).

The alkenyl group represented by $R^1$ and $R^2$ is preferably an alkenyl group having 2 to 6 carbon atoms, such as pentenyl, vinyl, allyl, 2-butenyl, or 1-propenyl. The sulfonyl group represented by $R^7$ is preferably a sulfonyl group having 1 to 10 carbon atoms, such as mesyl, tosyl, benzenesulfonyl or ethanesulfonyl. The acyl group represented by $R^7$ is preferably an acyl group having 2 to 10 carbon atoms, such as acetyl, propionyl or benzoyl. $R^6$ and $R^7$ may combine with each other to form a heterocyclic ring. Examples of the heterocyclic ring include a pyridine ring, morpholine ring, and piperazine. The heterocyclic ring may be substituted by a substituent, such as methyl, phenyl or ethoxycarbonyl.

Of the foregoing, it is preferred that $R^1$ and $R^2$ are each an alkyl group, $R^3$ and $R^4$ combine with each other to form a 5- or 6-membered ring, and $R^4$ is $—N(R^6)R^7$. It is more preferred that at least one of $R^6$ and $R^7$ is a phenyl group.

Examples of the anion represented by $X^-$ include a halide ion (e.g., $Cl^-$, $Br^-$, $I^-$), p-toluenesulfonate ion, ethylsufate ion, $PF_6^-$, $BF_4^-$ and $ClO_4^-$.

Next, the compound represented by formula (3) will be described. In the formula (3), the benzene or naphthalene ring (condensed benzene or naphthalene ring, or condensed benzo- or naphtho-ring), formed with $Z^3$ or $Z^4$, may be substituted by a substituent group as defined in the foregoing $Z^1$. The alkyl group represented by $R^{10}$, $R^{11}$, $R^{13}$, $R^{15}$, $R^{16}$, $R^{17}$, $R^{18}$, $R^{21}$ and $R^{22}$ is the same as defined in the foregoing $R^1$, $R^2$, $R^4$, $R^8$ and $R^9$.

$R^{15}$ and $R^{16}$, or $R^{17}$ and $R^{18}$ may combine with each other to form a ring (e.g., cyclohexane ring). The alkyl group represented by $R^{19}$ and $R^{20}$ is the same as defined in $R^6$ and $R^7$. The alkenyl group and aralkyl group represented by $R^{10}$ and $R^{11}$ are the same as defined in the foregoing $R^1$ and $R^2$. The aryl group represented by $R^{13}$, $R^{19}$, $R^{20}$, $R^{21}$, and $R^{22}$ is the same as defined in $R^4$, $R^6$, $R^7$, $R^8$ and $R^9$ in the foregoing formula (2). The halogen atom represented by $R^{13}$ is the same as defined in $R^4$ in the foregoing formula (2). Ring formation by the combination of $R^{19}$ and $R^{20}$ is the same as defined in $R^6$ and $R^7$. $X^-$ is the same as defined in the foregoing formula (2). In the preferred compound, $R^{10}$ and $R^{11}$ are each an alkyl group, $R^{12}$ and $R^{14}$ combine with each other to form a 5- or 6-memebered ring, and $R^{13}$ is $—N(R^{19})R^{20}$; in the more preferred compound, at least one of $R^{19}$ and $R^{20}$ is a phenyl group.

Next, the compound represented by formula (4) will be described. In the formula (4), the benzene or naphthalene ring (condensed benzene or naphthalene ring, or condensed benzo- or naphtho-ring), formed with $Z^3$ or $Z^4$ may be substituted by a substituent group as defined in the foregoing $Z^1$.

The alkyl group represented by $R^{10}$, $R^{11}$, $R^{15}$, $R^{16}$, $R^{17}$, and $R^{18}$ is the same as defined in the foregoing $R^1$, $R^2$, $R^4$, $R^8$, and $R^9$. $R^{15}$ and $R^{16}$, or $R^{17}$ and $R^{18}$ may combine with each other to form a ring (e.g., cyclohexane ring). The alkyl group represented by $R^{23}$ and $R^{24}$ is the same as define in $R^6$ and $R^7$ in the foregoing formula (2). The alkenyl group and aralkyl group represented by $R^{10}$ and $R^{11}$ are the same as defined in $R^1$ and $R^2$; the aryl group represented by $R^{23}$ and $R^{24}$ are the same as defined in $R^6$ and $R^7$ in the foregoing formula (2); and ring formation by the combination of $R^{23}$ and $R^{24}$ is the same as defined in $R^6$ and $R^7$. $X^-$ is the same as defined in the foregoing formula (2). In the preferred compound, $R^{10}$ and $R^{11}$ are each an alkyl group, and $R^{23}$ and $R^{24}$ are each a phenyl group.

Exemplary examples of compounds represented by formulas (2) through (4) are shown below, but the invention is not limited to these.

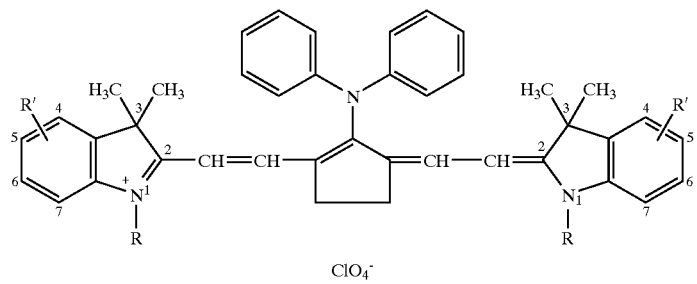

| Compound | R | R' |
|---|---|---|
| 1 | $CH_3$ | H |
| 2 | $CH_3$ | 5-Cl |
| 3 | $CH_3$ | 5-$OCH_3$ |
| 4 | $CH_3$ | 5-CN |
| 5 | $CH_3$ | 5-$CO_2C_2H_5$ |
| 6 | $CH_3$ | 5-$NO_2$ |
| 7 | $CH_3$ | 5-$CH_3$ |
| 8 | $CH_3$ | 5,6-di-Cl |
| 9 | $CH_3$ | 4,6-di-Cl |
| 10 | $C_2H_5$ | 5-Cl |

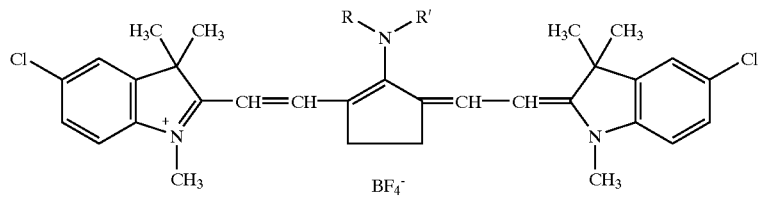

-continued
| | | |
|---|---|---|
| 11 | CH₃ | ─⌬ |
| 12 | C₂H₅ | ─⌬ |
| 13 | ─⌬─CH₃ | ─⌬─CH₃ |
| 14 | ─⌬─Br | ─⌬─Br |
| 15 | ─⌬(Cl,Cl) | ─⌬(Cl,Cl) |
| 16 | ─⌬─Cl | ─⌬─Cl |
| 17 | ─⌬─Cl (meta) | ─⌬ |
| 18 | CH₃ | CH₃ |
| 19 | C₂H₅ | C₂H₅ |
| 20 | CH₂CO₂CH₃ | CH₂CO₂CH₃ |
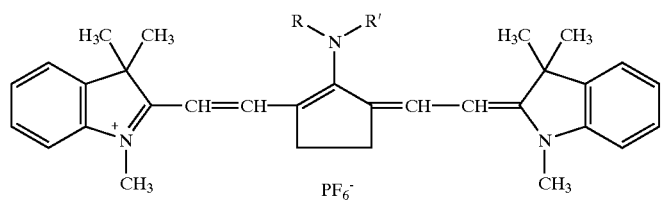
| | | |
|---|---|---|
| 21 | ─⌬ | ─naphthyl (2-) |
| 22 | ─⌬ | ─naphthyl (1-) |
| 23 | ─naphthyl (2-) | ─naphthyl (2-) |

-continued

| | | |
|---|---|---|
| 24 | CH₃ | 2-naphthyl |
| 25 | C₄H₉ | 2-naphthyl |
| 26 | phenyl | —SO₂CH₃ |
| 27 | phenyl | —COCH₃ |
| 28 | phenyl | H |

[Structure: bis(5-chloro-1,3,3-trimethylindolium) connected via –CH=CH–(cyclopentene with substituent R)=CH–CH– bridge; ClO₄⁻ counterion]

| Compound | R |
|---|---|
| 29 | Cl |
| 30 | OCH₃ |
| 31 | —O—phenyl |
| 32 | —O—(4-chlorophenyl) |
| 33 | CH₃ |
| 34 | —S—phenyl |
| 35 | —S—(4-t-C₄H₉-phenyl) |
| 36 | H |

[Structure: bis(1,3,3-trimethylindolium) connected via –CH=CH–A=CH–CH– bridge; ClO₄⁻ counterion]

| Compound | A |
|---|---|

-continued
37 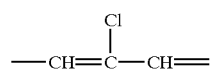
38 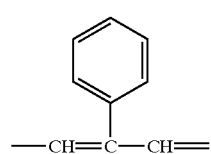
39 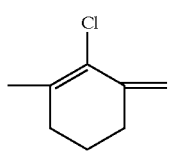
40 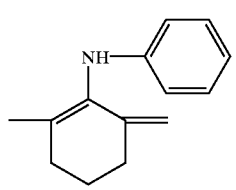
41 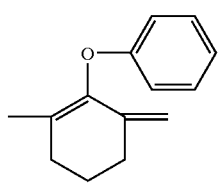
42 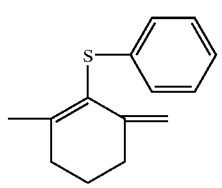
43 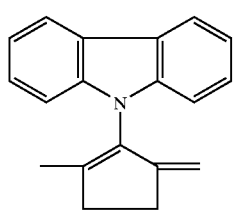
44 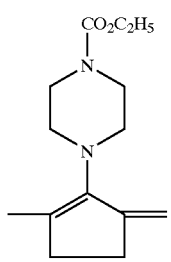
Compound 45

-continued
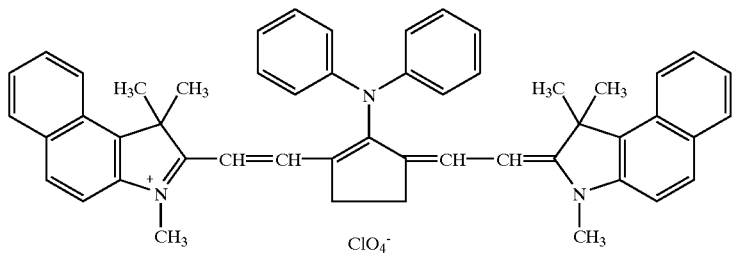
Compound 46
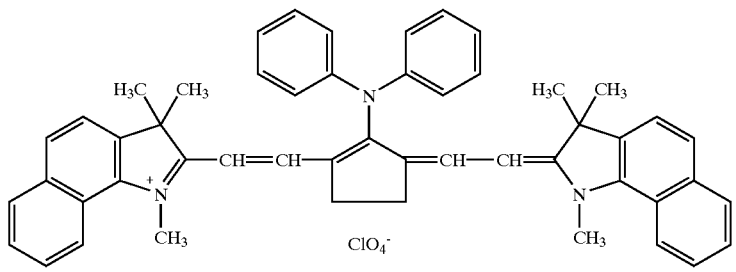
Compound 47
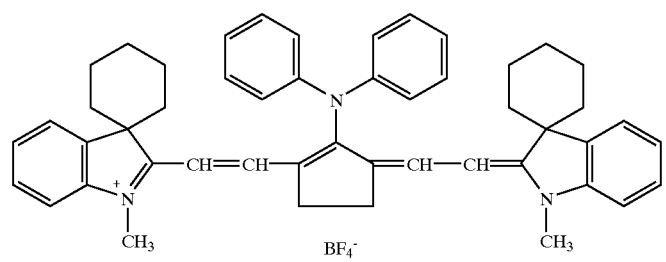
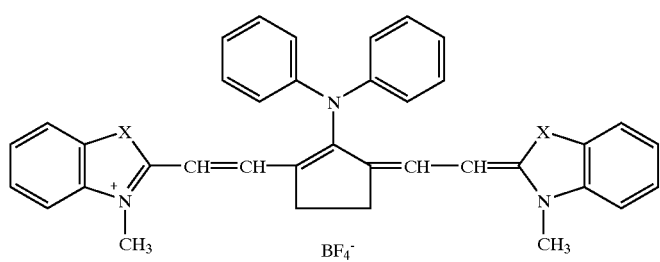
| Compound | X |
|---|---|
| 48 | O |
| 49 | S |
| 50 | N—CH₃ |
Compound 51
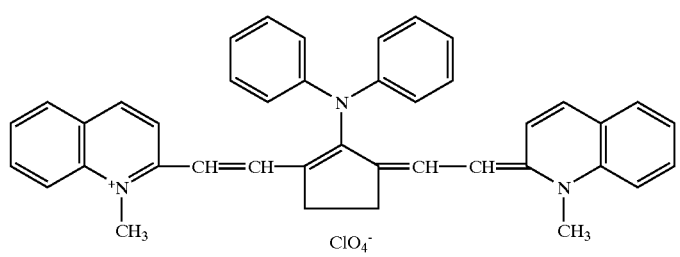
Compound 52

-continued

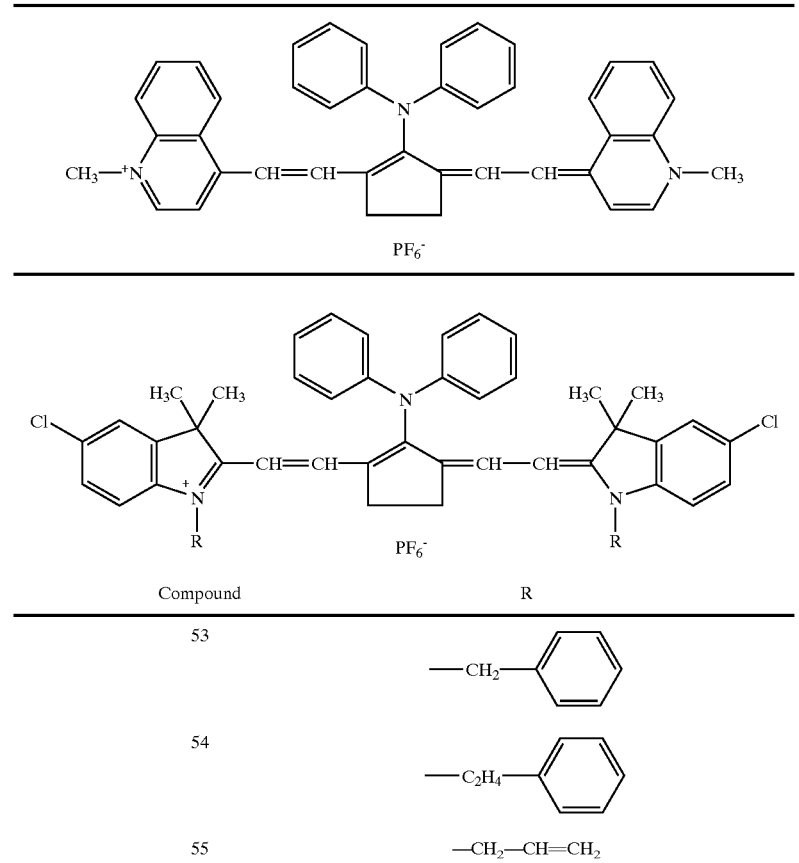

| Compound | R |
|---|---|
| 53 | —CH₂—C₆H₅ |
| 54 | —C₂H₄—C₆H₅ |
| 55 | —CH₂—CH=CH₂ |

The foregoing compounds can be readily synthesized with reference to exemplary synthesis described in U.S. Pat. No. 3,671,648.

Latex Comprising a Polymer Impregnated with Infrared Absorbing Compound

In general, a latex (or polymer latex) refers to a composition comprising a discontinuous phase of solid, water-insoluable polymer (which is also called latex polymer) particulates suspended in a continuous aqueous medium. Specifically, the latex comprising a polymer impregnated with an infrared absorbing compound, used in the invention is a latex comprised of polymer particulates which were impregnated with an infrared absorbing compound (or infrared dye). The latex comprising a polymer impregnated with an infrared absorbing compound (hereinafter, also denoted as an infrared absorbing compound-impregnated polymer latex or simply as an impregnated polymer latex) is classified into two main types, i.e., one which is obtained by dissolving an infrared absorbing compound dissolved in a monomer, followed by causing the monomer to be polymerized (emulsion polymerization) and the other one which is obtained in such a manner that an infrared absorbing compound is dissolved in an organic solvent and is mixed with polymer particulates dispersed in a latex solution, followed by removing the organic solvent. Either of the latexes prepared by the foregoing processes can optionally be selected. In cases where there is a concern about decomposition of the infrared absorbing compound at the stage of polymerization, the latter process is selected. Specifically, in the latter process, it is preferred that after removal of the organic solvent, the resulting dispersion is coated as such.

Alternatively, it is also preferred that additives are further incorporated thereto and the converted solution is subjected to coating and drying. In this case, the organic solvent may be removed at the stage of coating and drying. However, in view of variations of the absorption wavelength, the former process is relatively small in limitation with respect to coating and drying conditions and is preferable.

The layer that was obtained by dispersing a lipophilic dye simply in water and mixing it with a latex, followed by coating and drying exhibited a broad absorption band relative to an organic solvent solution of the compound. On the contrary, the layer that was obtained by subjecting the impregnated latex prepared in accordance with the foregoing procedure exhibited no change in absorption from that of the organic solvent solution. In view thereof, it is assumed that the infrared dye is included in the latex polymer particulates in the form of a molecular solution.

The content of an infrared absorbing compound (or an infrared dye) impregnating a polymer is preferably 0.01 to 10% by weight, based on the polymer. A content of less than 0.01% by weight results in reduced infrared absorption and a content of more than 10% by weight leads to a relatively broad absorption band.

The infrared absorbing compound-impregnated polymer latex, used as a preferable latex in the invention refers to a composition comprised of polymer particulates dispersed in an aqueous medium. The polymer particulates have an average size of 0.05 to 1.00 μm and examples of the polymer include an acryl type resin, polyester resin, rubbers, polyvinyl acetates, modified polyvinyl alcohol, cellulose esters, polyurethanes, polyvinyl chlorides, and polyvinylidene chlorides. Methods for dispersing a polymer in an aqueous medium include a method in which a polymeric resin is formed in advance, followed by dispersing the polymer in the aqueous medium and a method in which a monomer is subjected to emulsion polymerization or suspension polymerization in the aqueous medium, and of these, the preparation by the emulsion polymerization or suspension polymerization is preferred.

With respect to latex polymer composition, vinyl resins are preferred, and acryl type resin, styrene-acryl type resin, vinyl ester resin and acrylamide resin are specifically preferred.

Acrylic acid esters include, for example, ethyl acrylate, n-butyl acrylate, t-butyl acrylate, phenyl acrylate and 2-naphthyl acrylate; and methacrylic acid esters include, for example, methyl methacrylate, ethyl methacrylate, 2-hydroxyethyl methacrylate, glycidyl methacrylate, benzyl methacrylate, 2-hydroxypropyl methacrylate, phenyl methacrylate, cyclohexyl methacrylate, 4-chlorobenzyl methacrylate and ethylene glycol dimethacrylate.

As a monomer are exemplified vinyl esters (e.g., vinyl benzoate, pivaloyloxyethylene), acrylamides (e.g., acrylamide, methylacrylamide, ethylacrylamide, propylacrylamide, butylacrylamide, t-butylacrylamide, cyclohexylacrylamide, benzylacrylamide, hydroxymethylacrylamide, methoxyethylacrylamide, methoxyethylacrylamide, dimethylaminoethylacrylamide, phenylacrylamide, dimethylacrylamide, diethylacrylamide, β-cyanoethylacrylamide, and diacetoacrylamide), methacrylamides (e.g., methacrylamide, methyl methacylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, dimethylaminoethyl methacrylamide, phenyl methacrylamide, dimethyl methacrylamide, diethyl methacrylamide, β-cyanoethyl methacrylamide), styrenes (e.g., styrene, methylstyrene, dimethylstyrene, trimethylstyrene, ethylstyrene, isopropylstyrene, chlorostyrene, methoxystyrene, acetoxystyrene, dichlorostyrene, bromstyrene, and methyl vinylbenzoate), divinylbenzene, acrylnitrile, methacrylnitrile, N-vinylpyrrolidone, N-vinyloxazolidone, vinylidene chloride, phenyl vinyl ketone, acrylic acid, methacrylic acid, itaconic acid, maleic acid, alkyl itaconates such as monomethyl itacoinate and monomethyl itaconate, monoalkyl maleate such as monomethyl maleate and monoethyl maleate, citraconic acid, styrenesulfonic acid, vinylbenzenesulfonic acid, vinylsulfonic acid, acryloyloxyalkylsulfonic acid such as acryloyloxymethylsulfonic acid,acryloyloxyethylsulfonic acid or acryloyloxypropylsulfonic acid, methacryloyloxyalkylsulfonic acid such as methacryloyloxymethylsulfonic acid, methacryloyloxyethylsulfonic acid and methacryloyloxypropylsulfonic acid, acrylamidoalkylsulfonic acid such as 2-acrylamido-2-methylethanesulfonioc acid,2-acrylamido-2-methylpropanesulfonoc acid and 2-acrylamido-2-methybutanesulfonic acid, methacrylamidoalkylsulfonic acid such as 2-methacrylamido-2-methylethanesulfonic acid, 2-methacrylamido-2-methylpropanesulfonic acid and 2-methacrylamido-2-methylbutanesulfonic acid, in which the foregoing acids may contain an alkali metal (e.g., Na, K) or ammonium salt.

The copolymerization ratio of these monomers may be optional and not specifically limited. The particle size of a latex prepared by the emulsion polymerization method is preferably within the range of 0.01 to 1.0 μm.

Emulsion polymerization is conducted in a manner that using at least one kind of a surfactant, a monomer is emulsified in water or a water-miscible organic solvent (e.g., methanol, ethanol, acetone) and polymerization is performed using a radical polymerization initiator at a temperature of 30 to 100° C., and preferably 40 to 90° C. The content of the water-miscible organic solvent is 0 to 100%, and preferably 0 to 40% by weight, based on water. Polymerization reaction is usually performed using 0.05 to 5% by weight of a radical polymerization initiator and optionally using 0.1 to 10% by weight of an emulsifying agent.

Azobis-compounds, peroxides, hydroperoxides and a redox catalyst are used as the polymerization initiator, including, for example, potassium persulfate, ammonium persulfate, t-butylperoctoate, benzoyl peroxide, isopropyl carbonate, 2,4-dichlorobenzylperoxide, methyl ethyl ketone peroxide, cumene hydroquinone peroxide, dicumylperoxide, 2,2'-azobisisobutylate, 2,2'-azobis(2-amidinopropane) hydrochloride and potassium sulfite in combination with sodium hydrogen sulfite. Anionic, cationic, amphoteric and nonionic surfactants may be used as an emulsifying agent at the time when using water-soluble polymers described later. The surfactant is used in an amount of 0 to 25%, and 0 to 10% by weight, based on the water-soluble polymer. Examples of the surfactant include sodium laurate, sodium dodecylsulfate, sodium 1-octoxycarbonylmethyl-1-octoxycarbonylmethanesulfonate, sodium dodecylbenzenesulfonate, sodium dodecylnaphthalenesulfonate, sodium dodecylphosphate, cetyltrimethylammonium chloride, N-2-ethylhexylpyridinium chloride, polyoxyethylene nonylphenyl ether, and polyoxyethylene sorbitan laurate.

There may be used water-soluble polymers in emulsion polymerization of the polymer latex. Almost any water-soluble natural polymer or water-soluble synthetic polymer which contains a water-solubilizing anionic, cationic or nonionic group are usable. Examples of the anionic group include carboxylic acid or its salt, sulfonic acid or its salt and phosphoric acid or its salt; examples of the cationic group include tertiary amine or ammonium salt; examples of the nonionic group include hydroxy group, amido group, methoxy group, alkylene oxide group such as oxyethylene group, and a heteroatom ring such as pyrrolidine group.

As a water-soluble synthetic polymer are cited anionic and nonionic polymers. There may be used, for example, sulfonate-containing polymers such as polystyrenesulfonate, conjugated diene type sulfonate-containing polymers and polymers SP-1 through SP-28, as described in Japanese Patent Application No. 2000-97065, paragraph Nos. 0053 through 0058. Furthermore, water-soluble polymers may be used in combination thereof.

Water-based Coating Composition

In the invention, the water-based coating composition refers to a composition containing water as a main component. Besides water, a water-soluble organic solvent may optionally be contained. Examples of the water-soluble organic solvent include mono-alcohol compounds such as methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-methyl-2-butanol, or 3-methyl-2-butanol; polyhydric alcohol compounds such as ethylene glycol, polyethylene glycol, propylene glycol, triethylene glycol, polytriethylene glycol, tetraethylene glycol, polytetraethylene glycol, 1,3-butanedil, glycerin, and 1,2,6-hexanetriol. These water-soluble organic solvents may be used alone or in combination thereof. The water-soluble organic solvent is used in an amount of 0 to 20% by weight.

Further, a water-soluble polyester is contained in the composition to enhance strength of the infrared absorbing layer. The water-soluble polyester refers to a copolyester containing, as di-carboxylic acid components, a terephthalic acid unit (20 to 60 mol %), an isophthalic acid unit (20 to 60 mol %) and sulfoisophthalic acid unit (3 to 15 mol %). Any copolyester falling within the range described above is usable in the invention, without specific limitation. Other dicarboxylic acid components may be contained, and an aliphatic dicarboxylic acid is preferably contained.

Preferred examples of the copolyester are shown below:

CP-1
copolyester comprising a terephthalic acid unit (40 mol %), isophthalic acid unit (30 mol %), sulfoisophthalic acid unit (10 mol %) and cyclohexyldicarboxylic acid unit (20 mol %) as a dicarboxylic acid component; and ethylene glycol unit (100 mol %) as an ethylene glycol component;

CP-2
copolyester comprising a terephthalic acid unit (40 mol %), isophthalic acid unit (38 mol %), sulfoisophthalic acid unit (10 mol %) and cyclohexyldicarboxylic acid unit (12 mol %) as a dicarboxylic acid component; and ethylene glycol unit (100 mol %) as an ethylene glycol component;

CP-3
copolyester comprising a terephthalic acid unit (40 mol %), isophthalic acid unit (38 mol %), sulfoisophthalic acid unit (8 mol %) and cyclohexyldicarboxylic acid unit (14 mol %) as a dicarboxylic acid component; and ethylene glycol unit (100 mol %) as an ethylene glycol component;

CP-4
copolyester comprising a terephthalic acid unit (40 mol %), isophthalic acid unit (35 mol %), sulfoisophthalic acid unit (13 mol %) and cyclohexyldicarboxylic acid unit (12 mol %) as a dicarboxylic acid component; and ethylene glycol unit (100 mol %) as an ethylene glycol component;

CP-5
copolyester comprising a terephthalic acid unit (40 mol %), isophthalic acid unit (30 mol %), sulfoisophthalic acid unit (10 mol %) and cyclohexyldicarboxylic acid unit (20 mol %) as a dicarboxylic acid component; and ethylene glycol unit (70 mol %) and cyclohexyldimethanol unit (30 mol %) as an ethylene glycol component;

CP-6
copolyester comprising a terephthalic acid unit (45 mol %), isophthalic acid unit (45 mol %) and sulfoisophthalic acid unit (10 mol %) as a dicarboxylic acid component; and ethylene glycol unit (100 mol %) as an ethylene glycol component.

Active Methylene Group-containing Polymer Latex

In one aspect of the invention, a latex comprising a polymer containing an active methylene group (hereinafter, also denoted as an active methylene group-containing polymer latex) is contained in the composition to enhance adhesive strength between the infrared absorbing layer and a support. The active methylene group-containing polymer latex may be used as a polymer latex impregnated with an infrared absorbing compound or may be separately incorporated as other constituent.

A polymer containing an active methylene group usable in the invention is preferably represented by the following formula(5):

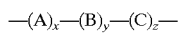 formula (5)

wherein A represents a repeating unit derived from an ethylenically unsaturated monomer containing an active methylene group represented by formula (6), as shown below; B represents a repeating unit derived from an ethylenically unsaturated monomer selected from the group consisting of a methacrylic acid ester, acrylic acid ester and maleic acid ester, provided that a homopolymer derived from B exhibits a glass transition temperature of not more than 35° C.; C represents a repeating unit derived from an ethylenically unsaturated monomer; x, y and z represent a percentage by weight of respective constituents and $5 \leq x \leq 60$, $5 \leq y \leq 90$ and $x+y+z=100$. The ethylenically unsaturated monomer containing an active methylene group represented by A is represented by the following formula (6):

 formula (6)

wherein $R^1$ represents a hydrogen atom, an alkyl group having 1 to 4 carbon atoms (e.g., methyl, ethyl, n-propyl, n-butyl) or a halogen atom (e.g., chlorine, bromine), and preferably a hydrogen atom, methyl or chlorine atom; L represents a bond or a bivalent linkage group, and is also represented by the following formula:

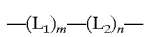

wherein $L_1$ represents —CON($R^2$)— (in which $R^2$ is a hydrogen atom, an unsubstituted alkyl group having 1 to 4 carbon atoms or a substituted alkyl group having 1 to 6 carbon atoms), —COO—, —NHCO—, —OCO—, or

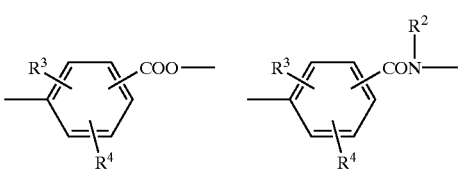

(in which $R^3$ and $R^4$ are each a hydrogen atom, hydroxy, halogen atom, substituted or unsubstituted alkyl, alkoxy, acyloxy or aryloxy group); $L_2$ represent a linkage group to link $L_1$ and X; m is 0 or 1, and n is 0 or 1. Further, $L_2$ is also represented by the following formula:

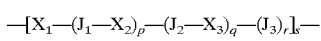

wherein each $J_1$, $J_2$ and $J_3$, which may be same or different, each represents —CO—, —SO$_2$—, —CON($R_5$)—, —SO$_2$N ($R_5$)—, —NR($R_5$)—$R_6$—, —NR($R_5$)—$R_6$—N($R_7$)—, —O—, —S—, —N($R_5$)—CO—N($R_7$)—, —N($R_5$)—SO$_2$N ($R_7$)—, —COO—, —OCO—, —N($R_5$)CO$_2$— or —N($R_5$) CO—, in which $R_5$ is a hydrogen atom, a substituted or unsubstituted alkyl group having 1 to 6 carbon atoms, $R_6$ is an alkylene group having 1 to 4 carbon atoms, and $R_7$ is a hydrogen atom or a substituted or unsubstituted alkyl group having 1 to 6 carbon atoms.

p, q, r and s are each 0 or 1; $X_1$, $X_2$ and $X_3$, which may be the same or different represent a substituted or unsubstituted alkylene group having 1 to 10 carbon atoms, an aralkylene group or phenylene group, provided that the alkylene group may be straight-chained or branched. Examples of the alkylene group include methylene, methylmethylene, dimethylmethlene, dimethylene, trimethylene, tetramethlene, pentamethylene, hexamethylene and decylmethylene; and examples of the aralkylene group include benzylidene; and examples of the phenylene group include p-phenylene, m-phenylene and methylphenylene.

X represents a univalent group containing an active methyle group, and preferred examples thereof include $R_8$—CO—$CH_2$—COO—, CN—$CH_2$—COO—, $R_8$—CO—$CH_2$—CO— and $R_8$—CO—$CH_2$—CON($R_5$)— where $R_5$ is the same as defined in the foregoing $R_5$; $R_6$ is a substituted or unsubstituted alkyl group (e.g., methyl, ethyl, n-propyl, n-butyl, t-butyl, n-nonyl, 2-methoxyethyl, 4-phenoxybutyl, benzyl, 2-methanesulfonamidoethyl), a substituted or unsubstituted aryl group (e.g., phenyl, p-methylphenyl, p-methoxyphenyl, o-chlorophenyl), an alkoxy group (e.g., methoxy, ethoxy, methoxyethoxy,n-butoxy), an aryloxy group (e.g., phenoxy, p-methylphenoxy, o-chlorophenoxy, p-cyanophenoxy), an amino group, and a substituted amino group (e.g., methylamino, ethylamino, dimethylamino, butylamino).

In the polymers represented by the foregoing formula (5), examples of the ethylenically unsaturated monomer containing an active methylene group, represented by A are shown below but are not limited to these.
MN-1 2-acetoacetoxyethyl methacrylate
MN-2 2-acetoacetoxyethyl acrylate
MN-3 2-acetoacetoxyethyl propylmethacrylate
MN-4 2-acetoacetoxyethyl propylacrylate
MN-5 2-acetoacetoamidoethyl methacrylate
MN-6 2-acetoacetoamidoethyl acrylate
MN-7 2-cyanoacetoxyethyl methacrylate
MN-8 2-cyanoacetoxyethyl acrylate
MN-9 N-(2-cyanoacetoxyethyl)acrylamide
MN-10 2-propionylacetoxyethyl acrylate
MN-11 N-(2-propionylacetoxyethyl) methacrylamide
MN-12 N-4-(acetoxybenzyl)phenylacrylamide
MN-13 ethylacryloylacetate
MN-14 methylacryloylacetate
MN-15 N-methacryloyloxymethylacetoacetoamide
MN-16 ethyl metacryloylacetoacetate
MN-17 N-allylcyanoacetoamide
MN-18 methylacryloylacetoacetate
MN-19 N-(2-methacryloyloxymethyl)cyanoacetoacetate
MN-20 p-(2-acetoacetyl)ethylstyrene
MN-21 4-acetoacetyl-1-methacryloylpiperazine
MN-22 ethyl-α-acetoacetoxymethacrylate
MN-23 N-butyl-N-acryloyloxyethylacetoacetoamide
MN-24 p-(2-acetoacetoxy)ethylstyrene The ethylenically unsaturated monomer providing the repeating unit represented by B in the foregoing formula (5) is a monomer, of which homopolymer exhibits a glass transition temperature (hereinafter, also denoted as Tg). Exemplary examples thereof include an alkyl acrylate (e.g., methyl acrylate, ethyl acrylate, butyl acrylate, n-butyl acrylate, n-hexyl acrylate, benzyl acrylate, 2-ethylhexyl acrylate, iso-nonyl acrylate, n-dodecyl acrylate), alkyl methacrylate (e.g., n-butyl methacrylate, n-hexyl methacrylate, 2-ethylhexyl methacrylate, iso-nonyl methacrylate, n-dodecyl methacrylate), and dienes (e.g., butadiene, isoprene). Of these, a preferred one is a monomer, a homopolymer formed of which exhibits a glass transition temperature of not more than 10° C. and examples thereof include an alkyl acrylate having an alkyl side chain having 2 or more carbons (e.g., ethyl acrylate, n-butyl acrylate, 2-ethylhexyl acrylate, i-nonyl acrylate), an alkyl methacrylate having an alkyl side chain having 6 or more carbons (e.g., n-hexyl methacrylate, 2-ethylhexyl methacrylate), and dienes (butadiene, isoprene). Tg values of the foregoing polymers are described in J. Brandrup, E. H. Immergut "Polymer Handbook" (John Wiley & Sons, 1989) page VI/209–VI/277.

The repeating unit represented by C in the foregoing formula (5) is one other than the foregoing B, i.e., a repeating unit derived from a monomer, whose homopolymer exhibits a Tg of more than 35° C. is preferred. Concrete examples thereof include acrylates (e.g., t-butyl acrylate, phenyl acrylate, 2-naphthyl acrylate), methacrylates (e.g., methyl methacrylate, ethyl methacrylate, 2-hydroxyethyl methacrylate, benzyl methacrylate, 2-hydroxypropyl methacrylate, phenyl methacrylate, cyclohexyl methacrylate, cresyl methacrylate, 4-chlorobenzyl methacrylate, ethylene glycol dimethacrylate, glycidyl methacrylate), vinyl esters (vinyl benzoate, pivaloyloxyethlene), acrylamides (e.g., arylamide, methylacrylamide, ethylacrylamide, propylacrylamide, butylacrylamide, t-butylacrylamide, cyclohexylacrylamide, benzylacrylamide, hydroxymethylacrylmide, dimethylaminoethylacrylamide, phenylacrylamide, dimethylacrylamide, diethylacrylamide, β-cyanoethylacrylamide, diacetoneacrylamide), methacrylamides (methacrylamide, methylmethacrylamide, ethylmethacrylamide, propylmethacrylamide, butylmethacrylamide, t-butyl-methacrylamide, cyclohexylmethacrylamide, benzylmethacrylmide, hydroxymethylmethacrylamide, methoxyethylmethacrylamide, dimethylaminoethylmethacrylamide, phenylmethacrylamide, dimethylmethacrylamide, diethylmethacrylamide, β-cyanoethylmethacrylamide), styrenes (e.g., styrene, methylstyrene, dimethylstyrene, trimethylenestyrene, ethylstyrene, isopropylstyrene, chlorostyrene, methoxystyrene, acetoxystyrene, chlorstyrene, dichlorstyrene, bromstyre, methyl vinylbenzoate), divinylbenzene, acrylonitrile, methacrylonitrile, N-vinylpyrrolidone, N-vinyloxazolidone, vinylide chloride, and phenyl vinyl ketone.

In the polymer represented by the foregoing formula (5), monomers containing an anionic functional group (e.g., carboxyl group, sulfonic acid group), as described in JP-B No. 60-15935, 45-3822 and 53-28086 (hereinafter, the term, JP-B refers to Japanese Patent publication) and U.S. Pat. No. 3,700,456 may be copolymerized to enhance latex stability. Examples of such a monomer include acrylic acid, methacrylic acid, maleic acid, itaconic acid, monoalkyl itaconate (e.g., monomethyl itaconate, monoethyl itaconate), monoalkyl maleate (e.g., monomethyl maleate, monoethyl maleate), citraconic acid, styrenesulfonic acid, vinylbenzenesulfonic acid, vinylsulfonic acid, acryloyloxyalkylsulfonic acid (e.g., acryloyloxymethylsulfonic acid, acryloyloxyethylsulfonic acid, acryloyloxypropylsulfonic acid), methacryloyloxyalkylsulfonic acid (e.g., methacryloyloxymethylsulfonic acid, methacryloyloxyethylsulfonic acid, methacryloyloxypropylsulfonic acid), acrylamidoalkylsulfonic acid (e.g., 2-acrylamido-2-methylethanesulfonioc acid, 2-acrylamido-2-methylpropanesulfonoc acid, 2-acrylamido-2-methybutanesulfonic acid), methacrylamidoalkylsulfonic acid (e.g., 2-methacrylamido-2-methylethanesulfonic acid, 2-methacrylamido-2-methylpropanesulfonic acid, 2-methacrylamido-2-methylbutanesulfonic acid), in which the foregoing acids may contain an alkali metal (e.g., Na, K) or ammonium salt.

The foregoing monomers containing an anionic functional group are usable in accordance with necessity, for example, for enhancing latex stability, irrespective of a glass transition temperature of the homopolymer thereof. The monomers are used preferably in an amount of 0.5 to 20%, and more preferably 1 to 10% by weight, based on the total polymer weight.

In the formula (5), x, y and z represent a percentage by weight of respective components, A, B and C, meeting the following requirements: $5 \leq x \leq 60$, $5 \leq y \leq 90$ and $x+y+z=100$.

The Tg of a latex polymer (i.e., a polymer constituting the latex) is preferably not less than $-60°$ C., and more preferably not less than $-40°$ C.

The active methylene group-containing polymer latex is preferably prepared through polymerization method. The size of polymer particles dispersed is not specifically limited but preferably is 0.01 to 1.0 μm.

The emulsion polymerization is conducted in a manner that using a water-soluble polyester as at least one kind of a emulsifying agent, a monomer is emulsified in water or a water-miscible organic solvent (e.g., methanol, ethanol, acetone) and polymerization is performed using a radical polymerization initiator at a temperature of 30 to 100° C., and preferably 40 to 90° C. The content of the water-miscible organic solvent is 0 to 100%, and preferably 0 to 40% by weight, based on water. Polymerization reaction is usually performed using 0.05 to 5% by weight of a radical polymerization initiator and optionally using 0.1 to 10% by weight of an emulsifying agent. The polymerization initiator, emulsifying agent and water-soluble polymer are the same as described earlier.

In the emulsion polymerization, the polymerization initiator, concentration, polymerization temperature and reaction time are readily and broadly variable in accordance with an intention. To carry out the emulsion polymerization reaction, all of a monomer, surfactant, water-soluble polyester and medium may be added into a reaction vessel in advance, followed by adding an initiator. Alternatively, polymerization may be carried out, while dropwise adding a part or all of respective components.

The active methylene group-containing monomers, represented by A in the foregoing formula (5), the kind of a polymer latex and the synthesis method thereof are further referred to U.S. Pat. Nos. 3,459,790, 3,619,195, 3,929,482, 3,700,456; West German Patent No. 2,442,165; European Patent No. 13,147; JP-A Nos. 50-73625 and 50-146331.

The composition of the active methylene group-containing polymer latex used in the invention are shown in Table 1, specifically with respect to monomers as represented by formula (5) but the invention is not limited to these.

TABLE 1

| Active Methylene Compound | A Compound | Content* | B Compound** | Content* | C Compound | Content* | Water-soluble Polymer/Surfactant |
|---|---|---|---|---|---|---|---|
| Lx-1 | MN-1 | 0.4 | BA | 0.2 | St | 0.4 | SP-22, S-2 |
| Lx-2 | MN-1 | 0.6 | BA | 0.1 | St | 0.3 | SP-22, S-2 |
| Lx-3 | MN-1 | 0.2 | BA | 0.3 | St | 0.5 | SP-22, S-2 |
| Lx-4 | MN-1 | 0.4 | AIN | 0.3 | CHMA | 0.3 | SP-22, S-2 |
| Lx-5 | MN-1 | 0.4 | EA | 0.2 | MMA | 0.4 | SP-22, S-2 |
| Lx-6 | MN-1 | 0.4 | EA | 0.2 | St | 0.4 | SP-22, S-2 |
| Lx-7 | MN-1 | 0.4 | VAc | 0.4 | EMA | 0.4 | SP-22, S-2 |
| Lx-8 | MN-2 | 0.4 | BA | 0.2 | St | 0.4 | SP-22, S-2 |
| Lx-9 | MN-1 | 0.2 | BA | 0.3 | St | 0.3 | SP-22, S-2 |
|  |  |  |  |  | GMA | 0.2 |  |
| Lx-10 | MN-1 | 0.4 | AIN | 0.3 | St | 0.3 | SP-22, S-2 |
| Lx-11 | MN-1 | 0.4 | AIN | 0.3 | St | 0.3 | SP-1, S-2 |
| Lx-12 | MN-1 | 0.4 | AIN | 0.3 | St | 0.3 | SP-2, S-2 |
| Lx-13 | MN-1 | 0.4 | AIN | 0.3 | St | 0.3 | SP-6, S-2 |
| Lx-14 | MN-1 | 0.4 | AIN | 0.3 | St | 0.3 | SP-7, S-2 |
| Lx-15 | MN-1 | 0.4 | AIN | 0.3 | St | 0.3 | SP-8, S-2 |
| Lx-16 | MN-1 | 0.4 | AIN | 0.3 | St | 0.3 | SP-13, S-2 |
| Lx-17 | MN-1 | 0.4 | AIN | 0.3 | St | 0.3 | SP-25, S-2 |
| Lx-18 | MN-1 | 0.4 | AIN | 0.3 | St | 0.3 | SP-26, S-2 |
| Lx-19 | MN-1 | 0.4 | AIN | 0.3 | St | 0.3 | S-2 |
| Lx-20 | MN-1 | 0.4 | AIN | 0.2 | St | 0.4 | SP-2 |
| Lx-21 | MN-1 | 0.4 | AIN | 0.55 | St | 0.05 | SP-22, S-2 |

*Weight ratio
**BA: Butyl acrylate
EA: Ethyl acrylate
AIN: iso-Nonyl acrylate
GMA: Glycidyl methacrylate
St: Styrene
EMA: Ethyl methacrylate
CHMA: Cyclohexyl methacrylate
MMA: Methyl methacrylate
VAc: Vinyl acetate In Table 1, S-2 represents sodium dodecybenzenesulfonate, and SP-1, SP-2, SP-6, SP-7, SP-8, SP-13, SP-22, SP-25 and SP-26 are shown below. The solid content of each latex was 30% solids.

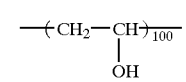

SP-1

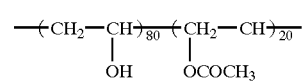

SP-2

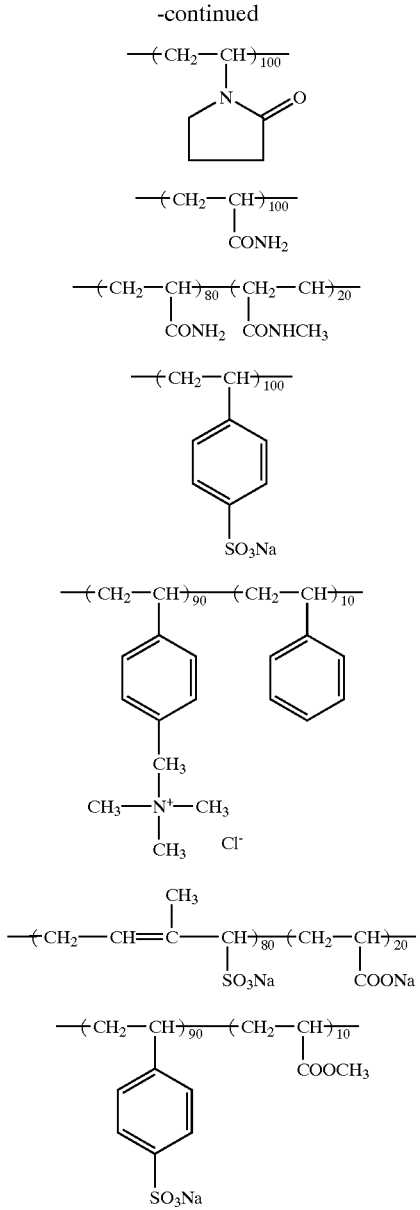

The water-based coating composition may optionally be added with additives, such as a latex, water-soluble polymer, thickening agent, fluidity improving agent, surfactant, conductivity adjusting agent, pH adjusting agent, antioxidant, UV absorbent, antiseptic, fungicide, defoaming agent and penetration agent.

Infrared Absorbing Film

Any substrate on which an infrared absorbing layer can be provide is usable as a base film used for the infrared absorbing film of the invention, and plastic film is preferable. Examples of plastic film include cellulose triacetate film, cellulose acetate-butyrate film, cellulose acetate-propionate film, polyethylene terephthalate film, polyethylene naphthalate film, modified polyester film described in JP-A No. 6-51437 and polycarbonate film. Furthermore, there are also usable laminated products of the foregoing films and paper coated or laminated with α-olefin polymer (e.g., polyethylene, polypropylene, ethylene-butene copolymer). Of these, cellulose triacetate film, polyethylene terephthalate film and polyethylene-laminated paper are commercially available.

These plastic films may optionally be colored. In the case of being used as a support of photothermographic imaging material, the plastic film thickness is preferably 50 to 250 μm.

Prior to coating the water-based coating composition on a plastic film, it is preferred to subject the plastic film surface to a pretreatment. Examples of the pretreatment include surface activation treatments such as a solution treatment by use of chemicals, alkali or mixed acids, mechanical surface-roughening treatment, corona discharge treatment, ultraviolet treatment, glow discharge treatment, activated plasma treatment, laser treatment, and ozone treatment.

Coating methods usable in the invention include, for example, dip coating, air-knife coating, curtain coating, roller coating, wire-bar coating, gravure coating and extrusion coating by use of a hopper, as described in U.S. Pat. No. 2,681,294. There is also applicable a method for simultaneously coating two or more layers, as described in U.S. Pat. No. 2,761,791, 3,508,947, 2,941,898 and 3,526,528, and Y. Harazaki, "Coating Engineering" page 153 (1973, published by ASAKURASHOTEN).

Drying is conducted at a temperature of 50 to 200° C. over a period of several seconds to several tens minutes.

The infrared absorbing layer according to the invention is obtained by coating a water-based coating composition containing a latex impregnated with an infrared absorbing compound. The infrared absorbing layer may be directly provided on a support or there may provided a layer between support and the infrared absorbing layer. The infrared absorbing layer may be provided farthest from the support (i.e., outermost layer) or in the middle (i.e., intermediate layer). There may be provided on the support one or two infrared absorbing layers. In the case of photothermographic imaging materials, the infrared absorbing layer is provided preferably on the opposite side of the support to the image forming layer, i.e., on the backing layer side. When the water-based coating composition is comprised of a latex impregnated with an infrared absorbing compound and water-soluble polymer or when the water-based coating composition is comprised of a latex impregnated with an infrared absorbing compound and an active methylene group-containing polymer latex, polyester film is preferred as a support, and a backing layer used for photothermographic material can be provided directly on a polyester support and preferable for use in photothermographic materials.

The infrared absorbing film of the invention may be any one which is provided with the foregoing infrared absorbing layer on the foregoing support. The support and infrared absorbing layer are optimally selected in accordance with the intended use.

Imaging Material

Imaging material relating to the invention is one which forms images using infrared rays, specifically, infrared lasers and in which an infrared absorbing layer can control image quality. Specifically, photothermographic imaging material is subjected to thermal development, so that the material is vulnerable during the development or the subsequent process. In the invention, a stable infrared absorbing layer is formed and is therefore preferable for use in photothermographic materials.

Thermally developable photothermographic imaging material is detailed in U.S. Pat. Nos. 3,152,904 and 3,457,075; D. Morgan "Dry Silver Photographic Material and D. H. Klosterboer "Thermally Processed Silver Systems" in Imaging Processes and Materials, Neblette 8th edition, Sturge, Walworth & Shepp, page 279, (1989).

Such a photothermographic imaging material contains a reducible light-insensitive silver source (such as organic silver salts), a catalytically active amount of photocatalyst (such as silver halide) and a reducing agent, which are dispersed in a binder matrix. Such photothermographic materials are stable at ordinary temperature and, after exposure, form silver upon heating at a relatively high temperature (e.g., 80° C. or higher) through an oxidation reduction reaction between the reducible silver source (which functions as an oxidizing agent) and the reducing agent. The oxidation reduction reaction is accelerated by catalytic action of a latent image produced by the exposure. Silver formed through reaction of the reducible silver salt in exposed areas provides a black image, which contrasts with non-exposes areas, leading to image formation.

Organic Silver Salt

The organic silver salts used in the invention are reducible silver source, and silver salts of organic acids are preferred and silver salts of long chain fatty acid (preferably having 10 to 30 carbon atom and more preferably 15 to 25 carbon atoms) are more preferred. Organic acid salts such as silver salts of behenic acid, arachidic acid, stearic acid, palmitic acid, lauric acid are specifically preferred. In addition to the silver salts of fatty acids, silver salts of organic heteroacids are also usable. Specifically, organic or inorganic complexes, ligand of which have a total stability constant to a silver ion of 4.0 to 10.0 are preferred. Exemplary preferred complex salts are described in RD17029 and RD29963, including organic acid salts (e.g., salts of gallic acid, oxalic acid, behenic acid, stearic acid, palmitic acid, lauric acid, etc.); carboxyalkylthiourea salts (e.g., 1-(3-carboxypropyl) thiourea, 1-(3-caroxypropyl)-3,3-dimethylthiourea, etc.); silver complexes of polymer reaction products of aldehyde with hydroxy-substituted aromatic carboxylic acid (e.g., aldehydes such as formaldehyde, acetaldehyde, butylaldehyde), hydroxy-substituted acids (e.g., salicylic acid, benzoic acid, 3,5-dihydroxybenzoic acid, 5,5-thiodisalicylic acid, silver salts or complexes of thiones (e.g., 3-(2-carboxyethyl)-4-hydroxymethyl-4-(thiazoline-2-thione and 3-carboxymethyl-4-thiazoline-2-thione), complexes of silver with nitrogen acid selected from imidazole, pyrazole, urazole, 1.2,4-thiazole, and 1H-tetrazole, 3-amino-5-benzylthio-1,2,4-triazole and benztriazole or salts thereof; silver salts of saccharin, 5-chlorosalicylaldoxime, etc.; and silver salts of mercaptides.

The silver coverage of the organic silver salt is preferably not more than 3 g/m$^2$, and more preferably not more than 2 g/m$^2$.

The organic silver salt compound can be obtained by mixing an aqueous-soluble silver compound with a compound capable of forming a complex. Normal precipitation, reverse precipitation, double jet precipitation and controlled double jet precipitation, as described in JP-A 9-127643 are preferably employed.

Silver Halide

Photosensitive silver halide emulsions usable in the thermally developable photosensitive materials according to the invention can be prepared according to the methods commonly known in the photographic art, such as single jet or double jet addition, or ammoniacal, neutral or acidic precipitation. Thus, the silver halide emulsion is prepared in advance and then the emulsion is mixed with other components of the invention to be incorporated into the composition used in the invention. To sufficiently bring the photosensitive silver halide into contact with an organic silver salt, there can be applied such techniques that polymers other than gelatin, such as polyvinyl acetal are employed as a protective colloid in the formation of photosensitive silver halide, as described in U.S. Pat. Nos. 3,706,564, 3,706,565, 3,713,833 and 3,748,143, British Patent 1,362,970; gelatin contained in a photosensitive silver halide emulsion is degraded with an enzyme, as described in British Patent 1,354,186; or photosensitive silver halide grains are prepared in the presence of a surfactant to save the use of a protective polymer, as described in U.S. Pat. No. 4,076,539.

Silver halide used in the invention functions as light sensor. Silver halide grains are preferably small in size to prevent milky-whitening after image formation and obtain superior images. The grain size is preferably not more than 0.1 $\mu$m, more preferably, 0.01 to 0.1 $\mu$m, and still more preferably, 0.02 to 0.08 $\mu$m. The form of silver halide grains is not specifically limited, including cubic or octahedral, regular crystals and non-regular crystal grains in a spherical, bar-like or tabular form. Halide composition thereof is not specifically limited, including any one of silver chloride, silver chlorobromide, silver iodochlorobromide, silver bromide, silver iodobromide, and silver iodide.

The content of silver halide is not more than 50%, preferably 0.1 to 25%, and more preferably 0.1 to 15%, based on total amount of silver halide and organic silver salt.

Light-sensitive silver halide used in the imaging material of the invention, as described in British Patent No. 1,447,454, can be formed simultaneously with the formation of organic silver salt by allowing a halide component such as a halide ion to concurrently be present together with organic silver salt-forming components and further introducing a silver ion thereinto during the course of preparing the organic silver salt.

Alternatively, a silver halide-forming component is allowed to act onto a pre-formed organic silver salt solution or dispersion or a sheet material containing an organic silver salt to convert a part of the organic silver salt to photosensitive silver halide. The thus formed silver halide is effectively in contact with the organic silver salt, exhibiting favorable actions. In this case, the silver halide-forming component refers to a compound capable of forming silver salt upon reaction with the organic silver salt. Such a compound can be distinguished by the following simple test. Thus, a compound to be tested is to be mixed with the organic silver salt, and if necessary, the presence of a peal specific to silver halide can be confirmed by the X-ray diffractometry, after heating. Compounds that have been confirmed to be effective as a silver halide-forming component include inorganic halide compounds, onium halides, halogenated hydrocarbons, N-halogeno compounds and other halogen containing compounds. These compounds are detailed in U.S. Pat. Nos. 4,009,039, 3,457,075 and 4,003,749, British Patent 1,498,956 and JP-A 53-27027 and 53-25420. Exemplary examples thereof are shown below:

(1) Inorganic halide compound: e.g., a halide compound represented by formula, MXn, in which M represents H, NH4 or a metal atom; n is 1 when M is H or NH4 and a number equivalent to a valence number of the metal atom when M is the metal atom; the metal atom includes lithium, sodium, potassium, cesium, magnesium, calcium, strontium, barium, zinc, cadmium, mercury, tin, antimony, chromium, manganese, cobalt, rhodium, and cerium, and molecular halogen such as aqueous bromine being also effective;

(2) Onium halide: e.g., quaternary ammonium halides such as trimethylphenylammonium bromide, cetylethyldimethylammonium bromide, and trimethylbenzylammonium bromide; and tertiary sulfonium halides such as trimethylsulfonium iodide;

(3) Halogenated hydrocarbons: e.g., iodoform, bromoform, carbon tetrachloride and 2-brom-2-methylpropane;
(4) N-halogeno compounds: e.g., N-chlorosuccinimide, N-bromosucciimde, N-bromophthalimide, N-bromoacetoamide, N-iodosuccinimide, N-bromophthalazinone, N-bromooxazolinone, N-chlorophthalazinone, N-bromoacetoanilide, N,N-dibromobenzenesulfonamide, N-bromo-N-methylbenzenesulfonamide, 1,3-dibromo-4,4-dimethylhydantoin and N-bromourazole;
(5) Other halogen containing compounds: e.g., triphenylmethyl chloride, triphenylmethyl bromide 2-bromoacetic acid, 2-bromoethanol and dichlorobenzophenone.

The silver halide forming component is used stoichiometrically in a small amount per organic silver salt. Thus, it is preferably 0.001 to 0.7 mol, and more preferably 0.03 to 0.5 mol per mol of organic silver salt. At least two kinds of silver halide forming components may be used in combination within the foregoing range. The silver halide prepared according to the manner described above may used with silver halide prepared separately. Reaction is performed preferably in the presence of a polymer to be used as a binder, in which the polymer is used in an amount of 0.01 to 100 parts by weight, and preferably 0.1 to 10 parts by weight.

The thus formed photosensitive silver halide can be chemically sensitized with a sulfur containing compound, gold compound, platinum compound, palladium compound, silver compound, tin compound, chromium compound or their combination. The method and procedure for chemical sensitization are described in U.S. Pat. No. 4,036,650, British Patent 1,518,850, JP-A 51-22430, 51-78319 and 51-81124. There are also applicable reduction sensitization with a reducing agent such as thiourea dioxide or ascorbic acid or a reducing sensitization technique such as silver digestion using a water-soluble silver salt such as silver nitrate. As described in U.S. Pat. No. 3,980,482, a low molecular weight amide compound may be concurrently present to enhance sensitivity at the time of converting a part of the organic silver salt to photosensitive silver halide.

To improve reciprocity law failure or adjust contrast, the photosensitive silver halide may be contained with metal ions of the 6th group to 11th group in the periodical table, such as Rh, Ru, Re, Ir, Os, Fe and their complexes and complex ions. Specifically, complex ions are preferred, e.g., Ir complex ions such as $IrCl_6^{2-}$ are preferably contained to improve reciprocity law failure. These metal ions or complex ions may be used singly or in combination. The content of the metal ion or complex ion is preferably $1\times10^{-9}$ to $1\times10^{-2}$ mol, and more preferably $1\times10^{-8}$ to $1\times10^{-4}$ mol per mol of silver halide.

Compounds, which provide these metal ions or complex ions, are preferably incorporated into silver halide grains through addition during the silver halide grain formation. These may be added during any preparation stage of the silver halide grains, that is, before or after nuclei formation, growth, physical ripening, and chemical ripening. However, these are preferably added at the stage of nuclei formation, growth, and physical ripening; furthermore, are preferably added at the stage of nuclei formation and growth; and are most preferably added at the stage of nuclei formation. These compounds may be added several times by dividing the added amount. Uniform content in the interior of a silver halide grain can be carried out. As disclosed in JP-A No. 63-29603, 2-306236, 3-167545, 4-76534, 6-110146, 5-273683, the metal can be non-uniformly occluded in the interior of the grain.

These metal compounds can be dissolved in water or a suitable organic solvent (for example, alcohols, ethers, glycols, ketones, esters, amides, etc.) and then added. Furthermore, there are methods in which, for example, an aqueous metal compound powder solution or an aqueous solution in which a metal compound is dissolved along with NaCl and KCl is added to a water-soluble silver salt solution during grain formation or to a water-soluble halide solution; when a silver salt solution and a halide solution are simultaneously added, a metal compound is added as a third solution to form silver halide grains, while simultaneously mixing three solutions; during grain formation, an aqueous solution comprising the necessary amount of a metal compound is placed in a reaction vessel; or during silver halide preparation, dissolution is carried out by the addition of other silver halide grains previously doped with metal ions or complex ions. Specifically, the preferred method is one in which an aqueous metal compound powder solution or an aqueous solution in which a metal compound is dissolved along with NaCl and KCl is added to a water-soluble halide solution. When the addition is carried out onto grain surfaces, an aqueous solution comprising the necessary amount of a metal compound can be placed in a reaction vessel immediately after grain formation, or during physical ripening or at the completion thereof or during chemical ripening.

Reducing Agent

Reducing agents are incorporated into the photothermographic material of the present invention. Examples of suitable reducing agents are described in U.S. Pat. Nos. 3,770,448, 3,773,512, and 3,593,863, and Research Disclosure Items 17029 and 29963, and include the following: aminohydroxycycloalkenone compounds (for example, 2-hydroxypiperidino-2-cyclohexane); esters of amino reductones as the precursor of reducing agents (for example, piperidinohexose reducton monoacetate); N-hydroxyurea derivatives (for example, N-p-methylphenyl-N-hydroxyurea); hydrazones of aldehydes or ketones (for example, anthracenealdehyde phenylhydrazone; phosphamidophenols; phosphamidoanilines; polyhydroxybenzenes (for example, hydroquinone, t-butylhydroquinone, isopropylhydroquinone, and (2,5-dihydroxy-phenyl) methylsulfone); sulfydroxamic acids (for example, benzenesulfhydroxamic acid); sulfonamidoanilines (for example, 4-(N-methanesulfonamide)aniline); 2-tetrazolylthiohydroquinones (for example, 2-methyl-5-(1-phenyl-5-tetrazolylthio)hydroquinone); tetrahydroquionoxalines (for example, 1,2,3,4-tetrahydroquinoxaline); amidoxines; azines (for example, combinations of aliphatic carboxylic acid arylhydrazides with ascorbic acid); combinations of polyhydroxybenzenes and hydroxylamines, reductones and/or hydrazine; hydroxamic acids; combinations of azines with sulfonamidophenols; α-cyanophenylacetic acid derivatives; combinations of bis-β-naphthol with 1,3-dihydroxybenzene derivatives; 5-pyrazolones, sulfonamidophenol reducing agents, 2-phenylindane-1,3-dione, etc.; chroman; 1,4-dihydropyridines (for example, 2,6-dimethoxy-3, 5dicarboethoxy-1,4-dihydropyridine); bisphenols (for example, bis(2-hydroxy-3-t-butyl-5-methylphenyl)methane, bis(6-hydroxy-m-tri)mesitol, 2,2-bis(4-hydroxy-3-methylphenyl)propane, 4,5-ethylidene-bis(2-t-butyl-6-methyl)phenol, UV-sensitive ascorbic acid derivatives and 3-pyrazolidones.

Binder

Binders suitable for the photothermographic material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly(vinylpyrrolidone), casein, starch, poly(acrylic acid), poly(methylmethacrylic acid), poly(vinyl chloride), poly(methacrylic acid), copoly(styrene-maleic acid anhydride), copoly(styrene-acrylonitrile), copoly(styrene-butadiene), poly(vinyl acetal) series (for example, poly(vinyl formal)and poly(vinyl butyral), poly(ester) series, poly(urethane) series, phenoxy resins, poly(vinylidene chloride), poly(epoxide) series, poly(carbonate) series, poly(vinyl acetate) series, cellulose esters, poly(amide) series. These may be hydrophilic or hydrophobic polymers. Of these, as a binder preferable for the thermally developable photosensitive layer is polyvinyl acetals and more preferably polyvinyl butyral. Cellulose esters exhibiting higher softening temperature, such as tri-acetyl cellulose or cellulose acetatebutylate are preferred for non-photosensitive layers such as an over-coat layer or sub-coat layer, specifically, a protective layer or backing layer. The amount of a binder in a photosensitive layer is preferably 1.5 to 6 g/m$^2$, and more preferably 1.7 to 5 g/m$^2$. The amount of less than 1.5 g/m2 results in an increase density of an unexposed area to levels unacceptable to practical use.

Matting Agent

In the invention, a matting agent is preferably incorporated into the image forming layer side. To enhance dimensional repeat accuracy, a polymeric matting agent or an inorganic matting agent is preferably incorporated in an amount of 0.5 to 30 per cent in weight ratio with respect to the total binder in the image forming layer side.

Materials of the matting agents employed in the present invention may be either organic substances or inorganic substances. Examples of the inorganic substances include silica described in Swiss Patent No. 330,158, etc.; glass powder described in French Patent No. 1,296,995, etc.; and carbonates of alkali earth metals or cadmium, zinc, etc. described in U.K. Patent No. 1.173,181, etc. Examples of the organic substances include starch described in U.S. Pat. No. 2,322,037, etc.; starch derivatives described in Belgian Patent No. 625,451, U.K. Patent No. 981,198, etc.; polyvinyl alcohols described in Japanese Patent Publication No. 44-3643, etc.; polystyrenes or polymethacrylates described in Swiss Patent No. 330,158, etc.; polyacrylonitriles described in U.S. Pat. No. 3,079,257, etc.; and polycarbonates described in U.S. Pat. No. 3,022,169.

The shape of the matting agent may be crystalline or amorphous. However, a crystalline and spherical shape is preferably employed. The size of a matting agent is expressed in the diameter of a sphere having the same volume as the matting agent. The particle diameter of the matting agent in the present invention is referred to the diameter of a spherical converted volume. The matting agent employed in the present invention preferably has an average particle diameter of 0.5 to 10 $\mu$m, and more preferably of 1.0 to 8.0 $\mu$m. Furthermore, the variation coefficient of the size distribution is preferably not more than 50 percent, is more preferably not more than 40 percent, and is most preferably not more than 30 percent. The variation coefficient of the size distribution as described herein is a value represented by the formula described below:

$$(\text{Standard deviation of particle size})/(\text{average particle size}) \times 100$$

The matting agent according to the present invention can be incorporated into any layer. In order to accomplish the object of the present invention, the matting agent is preferably incorporated into the layer other than the photosensitive layer, and is more preferably incorporated into the farthest layer from the support.

Addition methods of the matting agent include those in which a matting agent is previously dispersed into a coating composition and is then coated, and prior to the completion of drying, a matting agent is sprayed. When plural matting agents are added, both methods may be employed in combination.

Image Toning Agent

Image toning agents are preferably incorporated into the photothermographic material used in the present invention. Examples of preferred image toning agents are disclosed in Research Disclosure Item 17029, and include the following:

imides (for example, phthalimide), cyclic imides, pyrazoline-5-one, and quinazolinone (for example, succinimide, 3-phenyl-2-pyrazoline-5-on, 1-phenylurazole, quinazoline and 2,4-thiazolidione); naphthalimides (for example, N-hydroxy-1,8-naphthalimide); cobalt complexes (for example, cobalt hexaminetrifluoroacetate), mercaptans (for example, 3-mercapto-1,2,4-triazole); N-(aminomethyl)aryldicarboxyimides [for example, N-(dimethylaminomethyl)phthalimide]; blocked pyrazoles, isothiuronium derivatives and combinations of certain types of light-bleaching agents (for example, combination of N,N'-hexamethylene(1-carbamoyl-3,5-dimethylpyrazole), 1,8-(3,6-dioxaoctane)bis-(isothiuroniumtrifluoroacetate), and 2-(tribromomethyl-sulfonyl)benzothiazole; merocyanine dyes (for example, 3-ethyl-5-((3-etyl-2-benzothiazolinylidene-(benzothiazolinylidene))-1-methylethylidene-2-thio-2,4-oxazolidinedione); phthalazinone, phthalazinone derivatives or metal salts thereof (for example, 4-(1-naphthyl)phthalazinone, 6-chlorophthalazinone, 5,7-dimethylphthalazinone, and 2,3-dihydro-1,4-phthalazinedione); combinations of phthalazinone and sulfinic acid derivatives (for example, 6-chlorophthalazinone and benzenesulfinic acid sodium, or 8-methylphthalazinone and p-trisulfonic acid sodium); combinations of phthalazine and phthalic acid; combinations of phthalazine (including phthalazine addition products) with at least one compound selected from maleic acid anhydride, and phthalic acid, 2,3-naphthalenedicarboxylic acid or o-phenylenic acid derivatives and anhydrides thereof (for example, phthalic acid, 4-methylphthalic acid, 4-nitrophthalic acid, and tetrachlorophthalic acid anhydride); quinazolinediones, benzoxazine, naphthoxazine derivatives, benzoxazine-2,4-diones (for example, 1,3-benzoxazine-2,4-dione); pyrimidines and asymmetry-triazines (for example, 2,4-dihydroxypyrimidine), and tetraazapentalene derivatives (for example, 3,6-dimercapto-1,4-diphenyl-1H, 4H-2,3a,5,6a-tatraazapentalene). Preferred image toning agents include phthalazone or the combination of phthalazine and phthalic acid.

Support

Supports used in the imaging material relating to the invention include the substrate of the infrared absorbing film described earlier. The infrared absorbing layer obtained by coating a water-based coating solution containing a latex impregnated with an infrared absorbing compound according to the invention is provided preferably on the opposite side of the support to the image forming layer, i.e., on the backing layer side. The support thickness is preferably 50 to 300 μm, and more preferably 70 to 180 μm. When the water-based coating composition is comprised of a latex impregnated with an infrared absorbing compound and water-soluble polymer or when the water-based coating composition is comprised of a latex impregnated with an infrared absorbing compound and an active methylene group-containing polymer latex, polyester film is preferred as a support, and a backing layer used for photothermographic material can be provided directly on a polyester support and preferable for use in photothermographic materials.

Antistatic Agent

In the present invention, to improve an electrification property, a conducting compound such as a metal oxide and/or a conducting polymer can be incorporated into a construction layer. These compounds can be incorporated into any layer, preferably into a sublayer, a backing layer and an intermediate layer between a photosensitive layer and a sublayer, etc. In the present invention, the conducting compounds described in U.S. Pat. No. 5,244,773, column 14 through 20, are preferably used.

Layer Arrangement

The imaging material relating to the invention comprises at least one light-sensitive layer (or image forming layer) on a support. There may be provided the light-sensitive layer alone on the support but at least one light-insensitive layer is preferably provided on the light-sensitive layer.

Light-sensitive Layer

In one embodiment of the invention, the light-sensitive layer of the imaging material contains a mixture of light-sensitive silver halide and an organic silver salt, e.g., cubic silver iodobromide grains having an average size of 0.06 μm, monodispersibility of 10% and a variation coefficient of projection area of 8% and a silver salt of fatty acid such as behenic acid, arachidic acid or stearic acid, and a hydrophilic binder of 0.5 to 2.0 g per mol of silver. The light-sensitive layer further contains thermally softening binder to cause melt physical development in the layer to form images and a hardening agent. Infrared semiconductor laser (780–820 nm) is preferably used by addition of a sensitizing dye and a supersensitizer. Infrared semiconductor laser exposure is conducted preferably at 750 nm or more, and preferably 800 nm or more.

Preferred examples of infrared sensitizing dyes usable in the invention include thiacarbocyanines described in JP-B Nos. 48-42172, 51-9609, 55-39818 and JP-A Nos. 62-284343 and 2-105135; tricarbocyanines for use in infrared semiconductor laser sources, as described in JP-A Nos. 59-191032 and 60-80841; and 4-quinoline nucleus-containing dicarbocyanines represented by general formulas (IIIa) and (IIIb) described in JP-A Nos. 59-192242 and 3-67242 as well as infrared sensitizing dyes relating to the invention.

Coating

The infrared absorbing layer, protective layer and back coat layer are formed by water-based coating, in which commonly known air-knife coating, dip coating, bar coating, curtain coating or hopper coating are employed. Organic solvents such as methyl ethyl ketone (MEK), ethyl acetate and toluene is used as a solvent for a light-sensitive layer coating solution. At least two of the foregoing layers may be simultaneously coated.

Exposure

The wavelength of laser light for exposure is optionally variable in accordance with the kind of a spectral sensitizing dye used in the imaging material of the invention.

In the invention, exposure is preferably conducted by laser scanning exposure. It is also preferred to use a laser exposure apparatus, in which scanning laser light is not exposed at an angle substantially vertical to the exposed surface of the photosensitive material. The expression "laser light is not exposed at an angle substantially vertical to the exposed surface" means that laser light is exposed preferably at an angle of 55 to 880, more preferably 60 to 86°, still more preferably 65 to 84, and optimally 70 to 82°. When the photosensitive material is scanned with laser light, the beam spot diameter on the surface of the photosensitive material is preferably not more than 200 μm, and more preferably not more than 100 μm. Thus, the less spot diameter preferably reduces an angle displacing from verticality of the laser incident angle. The lower limit of the beam spot diameter is 10 μm. The thus laser scanning exposure can reduce deterioration in image quality due to reflection light, such as occurrence of interference fringe-like unevenness.

Exposure applicable in the invention is conducted preferably using a laser scanning exposure apparatus producing longitudinally multiple scanning laser light, whereby deterioration in image quality such as occurrence of interference fringe-like unevenness is reduced, as compared to scanning laser light with longitudinally single mode. Longitudinal multiplication can be achieved by a technique of employing backing light with composing waves or a technique of high frequency overlapping. The expression "longitudinally multiple" means that the exposure wavelength is not a single wavelength. The exposure wavelength distribution is usually not less than 5 nm and not more than 10 nm. The upper limit of the exposure wavelength distribution is not specifically limited but usually about 60 nm.

Photothermographic imaging materials relating to the invention are stable at ordinary temperature and, after exposed, the photothermographic materials are developed by heating at a relatively high temperature (e.g., 80 to 200° C.) to form silver images through an oxidation and reduction reaction between an organic silver salt (functioning as an oxidant) and a reducing agent. The reaction proceeds without supplying any processing solution such as water from the exterior. The heating temperature is preferably 80 to 200° C., and more preferably 100 to 150° C. Sufficiently high image densities cannot be obtained at a temperature lower than 80° C. and at a temperature higher than 200° C., the binder melts and is transferred onto the rollers, adversely affecting not only images but also transportability or the thermal processor.

EXAMPLES

The present invention will be further described based on examples but the embodiments of the invention are not limited to these.

Preparation of Latex Containing Infrared Absorbing Compound

To 107 g of a copolymer latex comprised of 20 wt % styrene, 40 wt % n-butyl acrylate and 40 wt % glycidyl methacrylate (St-nBA-GMA Lx, 30 wt % solids) was added 5 g of a 5% sodium dodecylbenzenesulfonate aqueous solution, and further thereto, a mixture solution comprised of 1 g of infrared absorbing compound 1-1 dissolved in 10 g of dibutyl phthalate and 20 g of ethyl acetate was gradually added. After completion of addition, the solution was stirred for 3 hrs. Thereafter, ethyl acetate was removed using an evaporator to obtain a latex impregnated with infrared absorbing compound 1-1 (denoted as impregnated latex A).

Impregnated latex B was prepared similarly to the foregoing impregnated latex A, except that active methylene latex Lx-9 was used in place of the copolymer latex comprised of 20 wt % styrene, 40 wt % n-butyl acrylate and 40 wt % glycidyl methacrylate (St-nBA-GMA Lx).

Preparation of Water-based Coating Composition A and B

To 100 g of the impregnated latex A, 400 g of an aqueous 15% solution of copolyester CP-1 and 100 g of active methylene latex Lx-1 were added and water was further added thereto to make 1 liter to obtain water-based coating composition A.

Water-based coating composition B was prepared similarly to the water-based coating composition A, except that impregnated latex B was used in place of impregnated latex A.

Preparation of Infrared Absorbing Film A and B

Using a blue 175 μm thick polyethylene terephthalate (PET) film (0.160 density, measured by densitometer PDA-65, produced by Konica Corp.), one side thereof was subjected to corona discharge at 8 w/m$^2$·min and further thereon was coated water-based coating composition A using a wire-bar so as to form a 10 μm thick layer and dried at 80° C. to obtain infrared absorbing film A.

Infrared absorbing film B was prepared similarly to the film A, except that the water-based coating composition B was used in place of the coating composition A.

Preparation of Infrared Absorbing Film C to L and N

Infrared absorbing films C through L and N were prepared similarly to the infrared absorbing film A, except that infrared absorbing compound 1-1, St-nBA-GMA Lx, copolyester an active methylene latex or respectively replaced by compounds is shown in Table 2.

Preparation of Infrared Absorbing Film M

Both sides of a transparent 100 μm thick polyethylene terephthalate film was subjected to a corona discharge treatment at 8 w/m$^2$·min. On one side thereof, the water-based coating composition A was coated using a wire-bar so as to form a 10 μm thick layer and dried at 80° C. and further on the other side, the water-based coating composition A was also coated so as to form a 10 μm thick layer and dried at 80° C. to prepare infrared absorbing film M.

Comparative Infrared Absorbing Film

Preparation of Solid Particle Dispersion of Infrared Absorbing Compound

Surfactant (Triton X-200, available from Rohm and Haas Co.) of 57 parts was dissolved in 285.43 parts of water and put into a 2 liters ball mill (product by IGARASHI KIKAI-SEIZO Co., Ltd.). Further thereto, 12 parts of infrared absorbing compound 1-1 was add together with 1200 parts of zirconium oxide beads (1 mm diameter) and pulverized at 1200 rpm for 18 hrs. The thus obtained dispersion of solid dye particles was a 4 wt % dispersion having particle sizes within the range of 0.1 to 1 μm and an average size of 0.25 μm.

Preparation of Comparative Water-based Coating Composition

Comparative water-based coating composition was prepared similarly to the coating composition A, except that the impregnated latex was replaced by 25 g of the dispersion of dye solid particles and 200 g of active methylene latex.

Preparation of Comparative Infrared Absorbing Film

Similarly to infrared absorbing film A, using a wire-bar, the comparative water-based coating composition was coated on the film base so as to form a 10 μm thick layer and dried to obtain comparative infrared absorbing film.

The thus prepared infrared absorbing films A through N and comparative infrared absorbing film are shown in Table 2.

TABLE 2

| | Infrared Absorbing Compound | | Water-based Coating | | Film Base | |
|---|---|---|---|---|---|---|
| | Impregnated Polymer Latex | | Composition | | Base | Coating |
| Sample | Compound | Latex | Copolyester | Latex | (thickness, μm) | Side |
| A | 1-1 | St/nBA/GMALx | CP-1 | Lx-1 | PET*$^1$ (175) | S*$^2$ |
| B | 1-1 | Lx-9 | CP-1 | Lx-1 | PET (175) | S |
| C | 1-1 | Lx-21 | CP-1 | Lx-1 | PET (175) | S |
| D | 1-1 | Lx-9 | CP-5 | Lx-1 | PET (175) | S |
| E | 1-1 | Lx-9 | CP-1 | Lx-3 | PET (175) | S |
| F | 1-1 | Lx-9 | CP-1 | Lx-21 | PET (175) | S |
| G | 1-1 | Lx-9 | CP-1 | St/nBA/GMALx | PET (175) | S |
| H | 1-3 | Lx-9 | CP-1 | Lx-1 | PET (175) | S |
| I | 1-4 | Lx-9 | CP-1 | Lx-1 | PET (175) | S |
| J | 1 | Lx-9 | CP-1 | Lx-1 | PET (175) | S |
| K | 2 | Lx-9 | CP-1 | Lx-1 | PET (175) | S |
| L | 10 | Lx-9 | CP-1 | Lx-1 | PET (175) | S |
| M | 1-1 | St/nBA/GMALx | CP-1 | Lx-1 | PET (100) | B*$^2$ |
| N | 1-1 | Lx-9 | CP-1 | — | PET (175) | S |
| Comp. | 1-1 (Dispersion*$^3$) | — | CP-1 | Lx-1 | PET (175) | S |

*$^1$Colored PET film
*$^2$S: Single-sided coating, B: Both-sided coating
*$^3$Solid particle dispersion Preparation of Photothermographic Material Using the thus prepared infrared absorbing films A through L and N and comparative infrared absorbing film, photothermographic materials were prepared according to the following procedure.

The other side of the film base opposite to the side provided with the infrared absorbing layer (A-L and N or comparative infrared absorbing layer) was subjected to corona discharge at 8 w/m$^2$min and further thereon, the following sublayer coating composition a-1 was coated so as to form a sublayer of 0.8 μm.

| Subbing Coating Composition a-1 | |
|---|---|
| Latex solution (solid 30%) of a copolymer consisting of butyl acrylate (30 weight %), t-butyl acrylate (20 weight %) | 270 g |

-continued

| Subbing Coating Composition a-1 | |
| --- | --- |
| styrene (25 weight %) and 2-hydroxy ethyl acrylate (25 weight %) | |
| Surfactant (A) | 0.6 g |
| Hexamethylene-1,6-bis (ethyleneurea) | 0.8 g |
| Water to make | 1 liter |

Preparation of Photosensitive Silver Halide Emulsion A

In 900 ml of deionized water were dissolved 7.5 g of inert gelatin having an average molecular weight of 100,000 and 10 mg of potassium bromide. After adjusting the temperature and the pH to 35 ° C. and 3.0, respectively, 370 ml of an aqueous solution containing 74 g silver nitrate and an equimolar aqueous solution containing potassium bromide, potassium iodide (in a molar ratio of 98 to 2) and $1\times10^{-4}$ mol/mol Ag of rhodium chloride were added over a period of 10 minutes by the controlled double-jet method, while the pAg was maintained at 7.7. Thereafter, 4-hydroxy-6-methyl-1,3,3a,7-tetraazaindene was added and the pH was adjusted to 5 using NaOH. There was obtained cubic silver iodobromide grains having an average grain size of 0.06 μm, a variation coefficient of the projection area equivalent diameter of 8 percent, and the proportion of the {100} face of 87 percent. The resulting emulsion was flocculated to remove soluble salts, employing a flocculating agent and after desalting, 0.1 g of phenoxyethanol was added and the pH and pAg were adjusted to 5.9 and 7.5, respectively to obtain silver halide emulsion a. The thus obtained silver halide emulsion was added with $5.3\times10^{-5}$ mol of chloroauric acid and $7.0\times10^{-5}$ mol of sublimed sulfur and chemically sensitized.

Preparation of Powdery Organic Silver Salt

In 945 ml water were dissolved 32.4 g of behenic acid, 9.9 g of arachidic acid and 5.6 g of stearic acid at 90° C. Then, after adding 98 ml of 1.5M aqueous sodium hydroxide solution with stirring and further adding 0.93 ml of concentrated nitric acid, the solution was cooled to a temperature of 55° C. and stirred for 30 min. to obtain an aqueous organic acid sodium salt solution. To the solution were added 15.1 g of the silver halide emulsion A obtained above. After adjusting the pH to 8.1 with an aqueous sodium hydroxide solution, 147 ml of 1M aqueous silver nitrate solution was added in 7 min. and stirring continued further for 20 min., then, the reaction mixture was filtered by the ultrafiltration to remove aqueous soluble salts. The thus obtained organic acid silver salt was comprised of particles having an average size of 0.8 μm and a coefficient of variation of grain size distribution of %. After forming a block of the dispersion and removing water, washing and removal of water were repeated further six times. Thereafter, the product was dried to obtain a pre-formed emulsion.

Preparation of Light-sensitive Emulsion A

The foregoing pre-formed emulsion was divided to two parts. Further thereto, 544 g of a 17 wt % methyl ethyl ketone of polyvinyl butyral (Butvar B-79, mean molecular weight of 3000, available from Monsanto Co.) and 107 g of toluene were gradually added and then dispersed at 27.46 MPa to obtain light-sensitive emulsion A.

Preparation of Photothermographic Material

On the opposite side of each of the foregoing infrared absorbing films to the infrared absorbing layer, the following layer were successively coated to obtain photothermographic materials A through L, N through P and comparative photothermographic material, in which drying was conducted at 60° C. for a period of 15 min. Thus, the following emulsion layer coating solution was coated at a silver coverage of 2.1 g/m² and further thereon, a protective layer coating solution was coated to form a protective layer.

| Emulsion layer coating solution | |
| --- | --- |
| Light-sensitive emulsion A | 240 g |
| Sensitizing dye (1) (0.1 wt % methanol solution) | 1.7 ml |
| Pyridinium bromide perbromide (6 wt % methanol solution) | 3 ml |
| Calcium bromide (0.1 wt % methanol solution) | 1.7 ml |
| Antifoggant [2-(tribrommethylsulfonyl)-quinoine, 10 wt % methanol solution] | 1.2 ml |
| 2-(4-chlorobenzoyl)benzoic acid (5 wt % methanol solution) | 9.2 ml |
| 2-mercaptobenzimidazole (1 wt % methanol solution) | 11 ml |
| Tribromomethylsulfoquinoline (5 wt % methanol solution) | 17 ml |
| Developer [1,1-bis(2-hydroxy-3,5-dimethyl-phenyl)methylpropane, 20 wt % methanol solution | 29.5 ml |

| Protective layer coating solution | |
| --- | --- |
| Acetone | 35 ml |
| Methyl ethyl ketone | 17 ml |
| Cellulose acetate | 2.3 g/m² |
| Methanol | 7 ml |
| Phthalazinone | 250 mg/m² |
| 4-Methylphthalic acid | 180 mg/m² |
| Tetrachlorophthalic acid | 150 mg/m² |
| Tetrachlorophthalic acid anhydride | 170 mg/m² |
| Matting agent (monodisperse silica, monodispersity of 10%, average particle size of 4 μm) | 70 mg/m² |
| Surfactant (A) | 10 mg/m² |

Sensitizing dye (1)

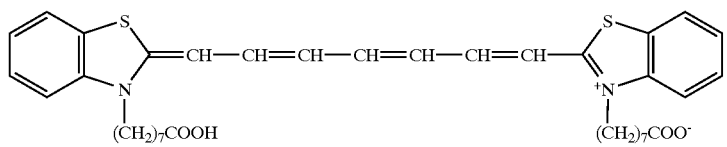

-continued

Surfactant (A)

C9H19—[benzene ring with C9H19]—O(CH2CH2O)₁₂—SO3Na

Infrared absorbing films A through P and comparative infrared absorbing film, and photothermographic materials A through P and comparative photothermographic material obtained by the use of the foregoing films were evaluate according to the following procedure.

Water Resistance

The infrared absorbing films were immersed in water at 25° C. for 15 min. and measured by an infrared spectrophotometer (HITACHI Spectrophotometer U-320). The films were evaluated with respect to variation in infrared light between before after being immersed in water.

Infrared Absorption

Using the foregoing infrared spectrophotometer, the infrared absorption films and ethyl acetate solutions of the respective infrared absorbing compounds contained in the films were each subjected to infrared spectrometry. Comparison was made with respect to difference in infrared absorption between the film and the solution.

Scratch Resistance of Backing Layer Surface

Photothermographic material samples were allowed to stand in an oven at 120° C. for 5 min. Immediately after taking out from the oven, each sample was placed on the table and the backing layer side of the sample was scrubbed with the non-woven fabric side of a sponge scrubbing brush (Scotch Bright TM) and visually observed with respect to abrasion thereof. Evaluation for each sample was made based on the following criteria:

5: no abrasion mark was observed,
4: slight abrasion marks were observed,
3: abrasion marks were observed
2 abrasion marks were entirely observed
1: not only abrasion but also peeling occurred.

Results are shown in Table 3.

TABLE 3

| Sample | Film Water Resistance | Film IR Absorption | Photothermographic Material Scratch resistance | Remark |
|---|---|---|---|---|
| A | no variation | no difference | 5 | Inv. |
| B | no variation | no difference | 5 | Inv. |
| C | no variation | no difference | 5 | Inv. |
| D | no variation | no difference | 5 | Inv. |
| E | no variation | no difference | 5 | Inv. |
| F | no variation | no difference | 5 | Inv. |
| G | no variation | no difference | 5 | Inv. |
| H | no variation | no difference | 5 | Inv. |
| I | no variation | no difference | 5 | Inv. |
| J | no variation | no difference | 5 | Inv. |
| K | no variation | no difference | 5 | Inv. |
| L | no variation | no difference | 5 | Inv. |
| M | no variation | no difference | No evaluation was made. | Inv. |
| N | no variation | no difference | 4 | Inv. |
| Comp. | no variation | marked difference | 1 | Comp. |

As can be seen from Table 3, it was proved that infrared absorbing films according to the invention, which were capable of forming an infrared absorbing layer, exhibited superior water resistance of the infrared absorbing layer and no difference in infrared absorption. It was further proved that photothermographic materials A through L and N exhibited superior scratch resistance on the backing layer side.

What is claimed is:

1. A photothermographic material comprising a support having thereon a light-sensitive layer containing a reducible organic silver salt, a light-sensitive silver halide, a reducing agent and a binder, wherein the support is provided with an infrared absorbing layer which was formed by coating on the support a water-based coating composition comprising a latex impregnated with an infrared absorbing compound and a water-soluble polyester or latex comprised of an active methylene group-containing polymer, and wherein the infrared absorbing layer is formed on the opposite side of the support to the light-sensitive layer.

2. The photothermographic material of claim 1, wherein said infrared absorbing compound is represented by the following formulas (1) through (4):

formula (1)

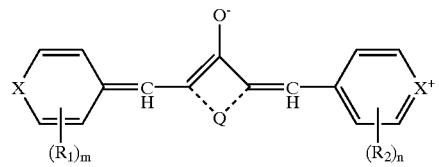

wherein X is a sulfur atom or an oxygen atom; $R_1$ and $R_2$ are each independently a univalent substituent group; m and n each represent 0, 1, 2, 3, or 4; Q is

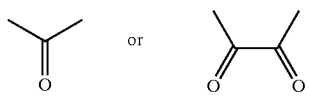

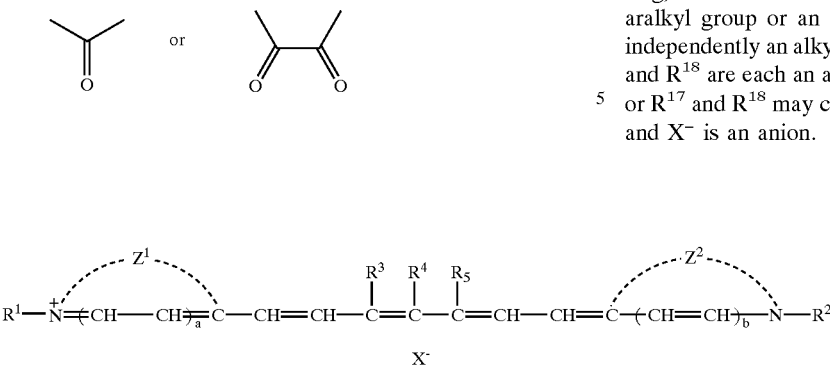

wherein $Z_1$ and $Z_2$ are each independently a non-metallic atom group necessary to form a 5- or 6-membered nitrogen containing heterocyclic ring; $R^1$ and $R^2$ are each independently an alkyl group, an alkenyl group or an aralkyl group; $R^3$ and $R^5$ are hydrogen atoms or each independently a non-metallic atom group necessary to form together with each other a 5- or 6-membered ring; $R^4$ is a hydrogen atom, an alkyl group, a halogen atom, an aryl group, —$N(R^6)R^7$, —$SR^8$ or —$OR^9$, in which $R^6$ is a hydrogen atom, an alkyl group, or an aryl group, $R^7$ is an alkyl group, an aryl group, a sulfonyl group or an acyl group, $R^8$ and $R^9$ are each an alkyl group or an aryl group, provided that $R^6$ and $R^7$ may form together with each other a 5- or 6-membered ring; a and b are each 0 or 1; and $X^-$ is an anion;

formula (3)

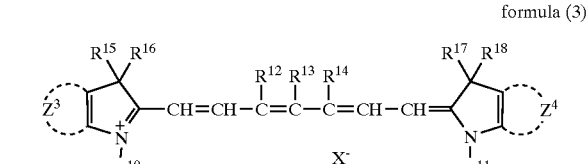

wherein $Z^3$ and $Z^4$ are each independently a non-metallic atom group necessary to form a benzene or naphthalene ring; $R^{10}$ and $R^{11}$ are each independently an alkyl group, an aralkyl group or an alkenyl group; $R^{12}$ and $R^{14}$ are hydrogen atoms or each independently a non-metallic atom group necessary to form together with each other a 5- or 6-membered ring; $R^{13}$ is a hydrogen atom, an alkyl group, a halogen atom, an aryl group, —$N(R^{19})R^{20}$, —$SR^{21}$ or —$OR^{22}$, in which $R^{19}$, $R^{20}$, $R^{21}$ and $R^{22}$ are each an alkyl group or an aryl group, provided that $R^{19}$ and $R^{20}$ may combine with each other to form a ring; $R^{15}$, $R^{16}$, $R^{17}$ and $R^{18}$ are each an alkyl group, provided that $R^{15}$ and $R^{16}$, or $R^{17}$ and $R^{18}$ may combine with each other to form a ring; and $X^-$ is an anion;

formula (4)

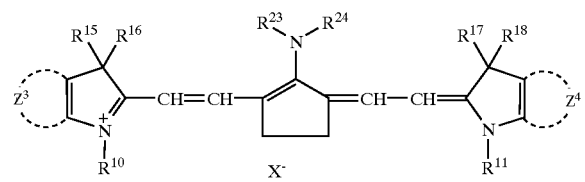

wherein $Z^3$ and $Z^4$ are each independently a non-metallic atom group necessary to form a benzene or naphthalene ring; $R^{10}$ and $R^{11}$ are each independently an alkyl group, an aralkyl group or an alkenyl group; $R^{23}$ and $R^{24}$ are each independently an alkyl group, or an aryl group; $R^{15}$, $R^{16}$, $R^{17}$ and $R^{18}$ are each an alkyl group, provided that $R^{15}$ and $R^{16}$, or $R^{17}$ and $R^{18}$ may combine with each other to form a ring; and $X^-$ is an anion.

3. The photothermographic material of claim 1, wherein said polymer impregnated with an infrared absorbing compound is at least one selected from the group consisting of an acryl resin, styrene-acryl resin, vinyl ester resin and acrylamide resin.

4. The photothermogrophic material of claim 1, wherein said water-soluble polyester is a copolyester comprising, as di-carboxylic acid constituent, a terephthalic acid unit of 20 to 60 mol %, an isophthalic acid unit of 20 to 60 mol % and sulfoisophthalic acid unit of 3 to 15 mol %.

5. The photothermographic material of claim 1, wherein said polymer containing an active methylene group is represented by the following formula (5):

$$-(A)_x-(B)_y-(C)_z-$$ formula (5)

wherein A represents a repeating unit derived from an ethylenically unsaturated monomer containing an active methylene group represented by the following formula (6); B represents a repeating unit derived from an ethylenically unsaturated monomer selected from the group consisting of a methacrylic acid ester, acrylic acid ester and maleic acid ester, provided that a homopolymer derived from B exhibits a glass transition temperature of not more than 35° C.; C represents a repeating unit derived from an ethylenically unsaturated monomer; x, y and z are defined as $5 \leq x \leq 60$, $5 \leq y \leq 90$ and $x+y+z=100$; formula (6) is

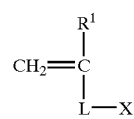

wherein $R^1$ is a hydrogen atom, an alkyl group having 1 to 4 carbon atoms or a halogen atom; L is a single bond or bivalent linkage group; and X is a univalent group containing an active methylene group.

6. The coating composition of claim 5, wherein in formula (6), X is $R_8$—CO—$CH_2$—COO—, CN—$CH_2$COO—, $R_8$CO—$CH_2$—CO— or $R_8$—CO—$CH_2$—CON($R_5$)—, in which $R_5$ is a hydrogen atom or an alkyl group having 1 to 6 carbon atoms, and $R_8$ is an alkyl group, an aryl group, an alkoxy group, a cycloalkyloxy group, an aryloxy group or an amino group.

* * * * *